United States Patent
Hosseini et al.

(10) Patent No.: US 11,917,617 B2
(45) Date of Patent: Feb. 27, 2024

(54) RESOURCE SELECTION FOR SIDELINK COORDINATION INFORMATION REQUEST MESSAGES

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Tugcan Aktas, La Jolla, CA (US); Yi Huang, San Diego, CA (US); Wei Yang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/444,411

(22) Filed: Aug. 4, 2021

(65) Prior Publication Data

US 2022/0046626 A1 Feb. 10, 2022

Related U.S. Application Data

(60) Provisional application No. 62/706,298, filed on Aug. 7, 2020.

(51) Int. Cl.
*H04W 72/04* (2023.01)
*H04W 72/20* (2023.01)

(52) U.S. Cl.
CPC .................................. *H04W 72/20* (2023.01)

(58) Field of Classification Search
CPC ..... H04W 72/04; H04W 68/02; H04W 92/14; H04W 8/20; H04W 8/08; H04W 8/245; H04W 76/25; H04W 56/00; H04W 92/045; H04W 76/00; H04W 24/08; H04W 8/24; H04W 74/0808; H04W 72/0446; H04W 72/1263; H04W 72/0406; H04W 72/0453; H04W 72/082; H04W 72/121; H04L 5/00; H04L 1/00; H04L 1/0003; H04L 1/0016
USPC ........................................................ 370/329
See application file for complete search history.

(56) References Cited

U.S. PATENT DOCUMENTS

| | | | | |
|---|---|---|---|---|
| 9,942,917 B2* | 4/2018 | Faurie | .................... | H04W 72/04 |
| 10,638,506 B2* | 4/2020 | Faurie | .................... | H04W 72/23 |
| 10,833,812 B2* | 11/2020 | Wang | .................... | H04L 1/1864 |
| 11,178,565 B2* | 11/2021 | Tseng | .................... | H04W 40/22 |
| 11,432,265 B2* | 8/2022 | Lee | .................... | H04W 52/146 |
| 11,503,567 B2* | 11/2022 | Kang | .................... | H04W 4/021 |
| 11,589,380 B2* | 2/2023 | Faurie | .................... | H04W 72/542 |
| 11,595,858 B2* | 2/2023 | Lee | .................... | H04W 76/14 |
| 11,601,789 B2* | 3/2023 | Panteleev | .................... | H04W 72/1263 |
| 11,658,790 B2* | 5/2023 | Hosseini | .................... | H04L 5/001 |
| | | | | 370/329 |
| 11,659,551 B2* | 5/2023 | Cao | .................... | H04W 72/20 |
| | | | | 370/330 |
| 2020/0029340 A1* | 1/2020 | He | .................... | H04W 76/14 |

(Continued)

*Primary Examiner* — Man U Phan
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a set of resources for sidelink coordination information requests. The UE may transmit a sidelink coordination information request message in at least one resource selected from the set of resources for sidelink coordination information requests. Numerous other aspects are provided.

30 Claims, 13 Drawing Sheets

(56) References Cited

U.S. PATENT DOCUMENTS

| | | | |
|---|---|---|---|
| 2020/0037343 A1* | 1/2020 | He | H04W 28/0268 |
| 2022/0322301 A1* | 10/2022 | Kiilerich Pratas | H04L 5/16 |
| 2023/0087401 A1* | 3/2023 | Shin | H04L 5/0037 370/329 |

* cited by examiner

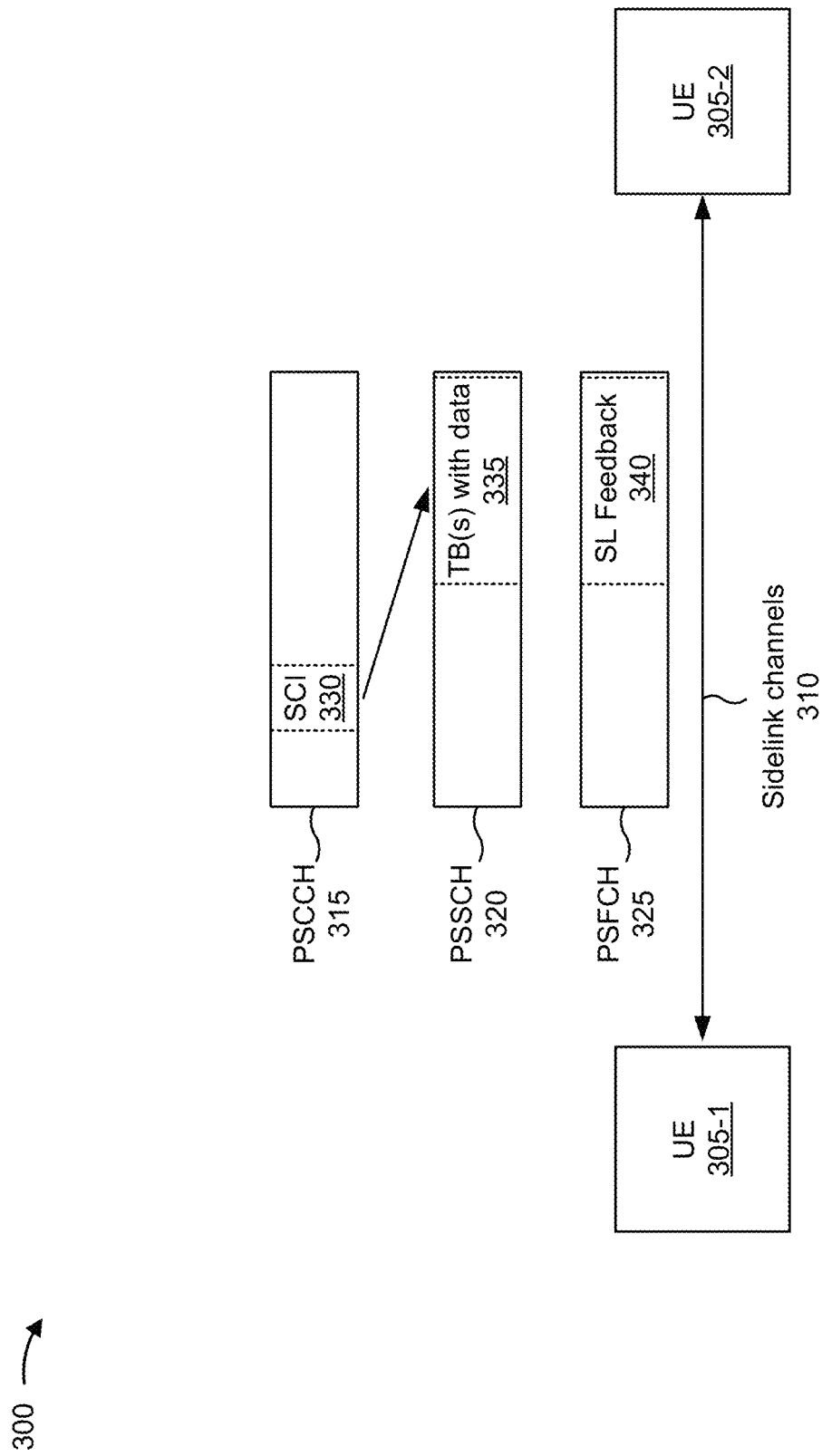

RESOURCE SELECTION FOR SIDELINK COORDINATION INFORMATION REQUEST MESSAGES

CROSS-REFERENCE TO RELATED APPLICATION

This patent application claims priority to U.S. Provisional Patent Application No. 62/706,298, filed on Aug. 7, 2020, entitled "RESOURCE SELECTION FOR SIDELINK COORDINATION INFORMATION REQUEST MESSAGES," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for resource selection.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a configuration of a set of resources for sidelink coordination information requests. The one or more processors may be configured to transmit a sidelink coordination information request message in at least one resource selected from the set of resources for sidelink coordination information requests.

Some aspects described herein relate to a UE for wireless communication. The UE may include a memory and one or more processors coupled to the memory. The one or more processors may be configured to transmit a sidelink coordination information request message in at least one resource selected from a set of resources for sidelink coordination information requests. The one or more processors may be configured to receive a sidelink coordination information report message in response to the sidelink coordination information request message.

Some aspects described herein relate to a UE for wireless communication. The UE may include a memory and one or more processors coupled to the memory. The one or more processors may be configured to receive a configuration of a set of resources for sidelink coordination information requests. The one or more processors may be configured to receive a sidelink coordination information request message in at least one resource from the set of resources for sidelink coordination information requests.

Some aspects described herein relate to a UE for wireless communication. The UE may include a memory and one or more processors coupled to the memory. The one or more processors may be configured to receive a sidelink coordination information request message in at least one resource from a set of resources for sidelink coordination information requests. The one or more processors may be configured to transmit a sidelink coordination information report message in response to the sidelink coordination information request message.

Some aspects described herein relate to a method of wireless communication performed by a UE. The method may include receiving a configuration of a set of resources for sidelink coordination information requests. The method may include transmitting a sidelink coordination information request message in at least one resource selected from the set of resources for sidelink coordination information requests.

Some aspects described herein relate to a method of wireless communication performed by a UE. The method may include transmitting a sidelink coordination information request message in at least one resource selected from a set of resources for sidelink coordination information requests. The method may include receiving a sidelink coordination information report message in response to the sidelink coordination information request message.

Some aspects described herein relate to a method of wireless communication performed by a UE. The method may include receiving a configuration of a set of resources for sidelink coordination information requests. The method may include receiving a sidelink coordination information request message in at least one resource from the set of resources for sidelink coordination information requests.

Some aspects described herein relate to a method of wireless communication performed by a UE. The method may include receiving a sidelink coordination information request message in at least one resource from a set of resources for sidelink coordination information requests. The method may include transmitting a sidelink coordination information report message in response to the sidelink coordination information request message.

Some aspects described herein relate to a non-transitory computer-readable medium that stores a set of instructions for wireless communication by a UE. The set of instructions, when executed by one or more processors of the UE, may cause the UE to receive a configuration of a set of resources for sidelink coordination information requests. The set of instructions, when executed by one or more processors of the UE, may cause the UE to transmit a sidelink coordination information request message in at least one resource selected from the set of resources for sidelink coordination information requests.

Some aspects described herein relate to a non-transitory computer-readable medium that stores a set of instructions for wireless communication by a UE. The set of instructions, when executed by one or more processors of the UE, may cause the UE to transmit a sidelink coordination information request message in at least one resource selected from a set of resources for sidelink coordination information requests. The set of instructions, when executed by one or more processors of the UE, may cause the UE to receive a sidelink coordination information report message in response to the sidelink coordination information request message.

Some aspects described herein relate to a non-transitory computer-readable medium that stores a set of instructions for wireless communication by a UE. The set of instructions, when executed by one or more processors of the UE, may cause the UE to receive a configuration of a set of resources for sidelink coordination information requests. The set of instructions, when executed by one or more processors of the UE, may cause the UE to receive a sidelink coordination information request message in at least one resource from the set of resources for sidelink coordination information requests.

Some aspects described herein relate to a non-transitory computer-readable medium that stores a set of instructions for wireless communication by a UE. The set of instructions, when executed by one or more processors of the UE, may cause the UE to receive a sidelink coordination information request message in at least one resource from a set of resources for sidelink coordination information requests. The set of instructions, when executed by one or more processors of the UE, may cause the UE to transmit a sidelink coordination information report message in response to the sidelink coordination information request message.

Some aspects described herein relate to an apparatus for wireless communication. The apparatus may include means for receiving a configuration of a set of resources for sidelink coordination information requests. The apparatus may include means for transmitting a sidelink coordination information request message in at least one resource selected from the set of resources for sidelink coordination information requests.

Some aspects described herein relate to an apparatus for wireless communication. The apparatus may include means for transmitting a sidelink coordination information request message in at least one resource selected from a set of resources for sidelink coordination information requests. The apparatus may include means for receiving a sidelink coordination information report message in response to the sidelink coordination information request message.

Some aspects described herein relate to an apparatus for wireless communication. The apparatus may include means for receiving a configuration of a set of resources for sidelink coordination information requests. The apparatus may include means for receiving a sidelink coordination information request message in at least one resource from the set of resources for sidelink coordination information requests.

Some aspects described herein relate to an apparatus for wireless communication. The apparatus may include means for receiving a sidelink coordination information request message in at least one resource from a set of resources for sidelink coordination information requests. The apparatus may include means for transmitting a sidelink coordination information report message in response to the sidelink coordination information request message.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams illustrating an example of sidelink communications, in accordance with the present disclosure.

DETAILED DESCRIPTION

Figure 1:
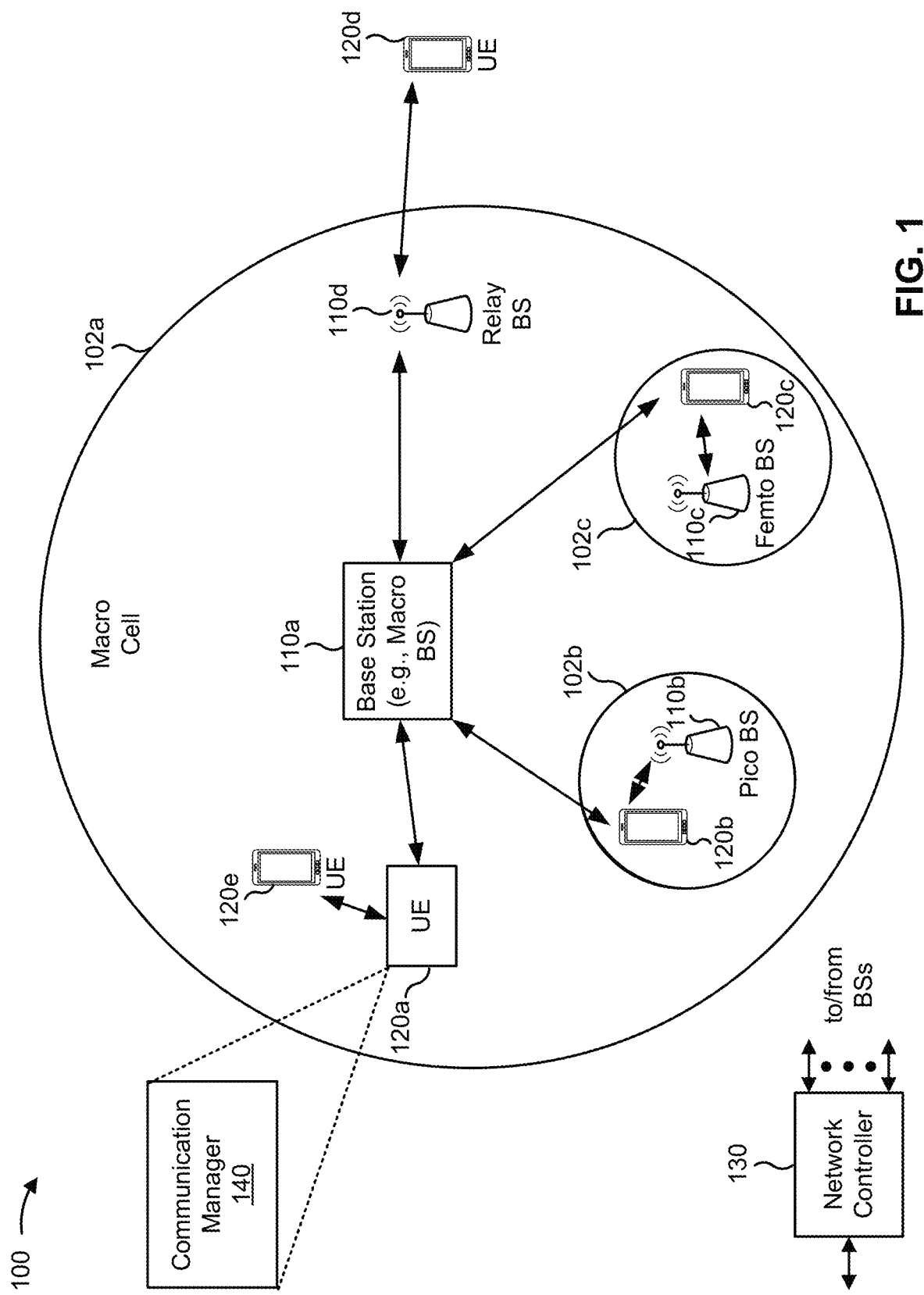
FIG. 1 is a diagram illustrating an example of a wireless network, in accordance with the present disclosure.

Inter-user equipment (UE) coordination enables a first UE to perform resource selection in order to facilitate sidelink communications by a second UE. For example, the second UE, or a base station, may transmit an inter-UE coordination request that the first UE perform an inter-UE coordination operation. The first UE may identify a set of resources in a selection window based at least in part on receiving the inter-UE coordination request and based at least in part on a sensing operation and may transmit an inter-UE coordination message to the second UE indicating the set of resources. The second UE may select a resource of the set of resources and may communicate on the selected resource.

A UE engaged in sidelink communication may be configured with resources that are to be used to transmit and/or receive requests for sidelink inter-UE coordination information (which may be referred to as requesting resources). Accordingly, a UE may need to select requesting resources that are to be used for transmitting sidelink inter-UE coordination information requests. In particular, a UE may need to select a requesting resource so as to minimize blind decoding attempts of requesting resources, reduce collision in requesting resources, and/or the like.

Some techniques and apparatuses described herein enable selection of requesting resources that are to be used for transmitting sidelink inter-UE coordination information requests, and specifically, to minimize blind decoding attempts of requesting resources, reduce collision in requesting resources, and/or the like. For example, a UE may select requesting resources by sensing channel availability, may select requesting resources at random, may select requesting resources according to an indexing of the requesting resources and based at least in part on an identifier of the UE or an identifier of a UE that is to receive the request, and/or may select requesting resources according to a resource assignment. In this way, a performance of requests for sidelink inter-UE coordination information may be improved by reducing collision in requesting resources, wireless resources may be conserved, UE power consumption may be reduced, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may provide means for receiving a configuration of a set of resources for sidelink coordination information requests, means for determining at least one resource for use in transmitting or receiving a sidelink coordination information request message from the set of resources for sidelink coordination information requests, means for transmitting or receiving the sidelink coordination information request message in the at least one resource, or means for transmitting or receiving a sidelink coordination information report message in response to the sidelink coordination information request message. Additionally, or alternatively, the communication manager 140 may perform one or more other operations described herein.

As indicated above, FIG. 1 is provided as an example. Other examples may differ from what is described with regard to FIG. 1.

Figure 2:
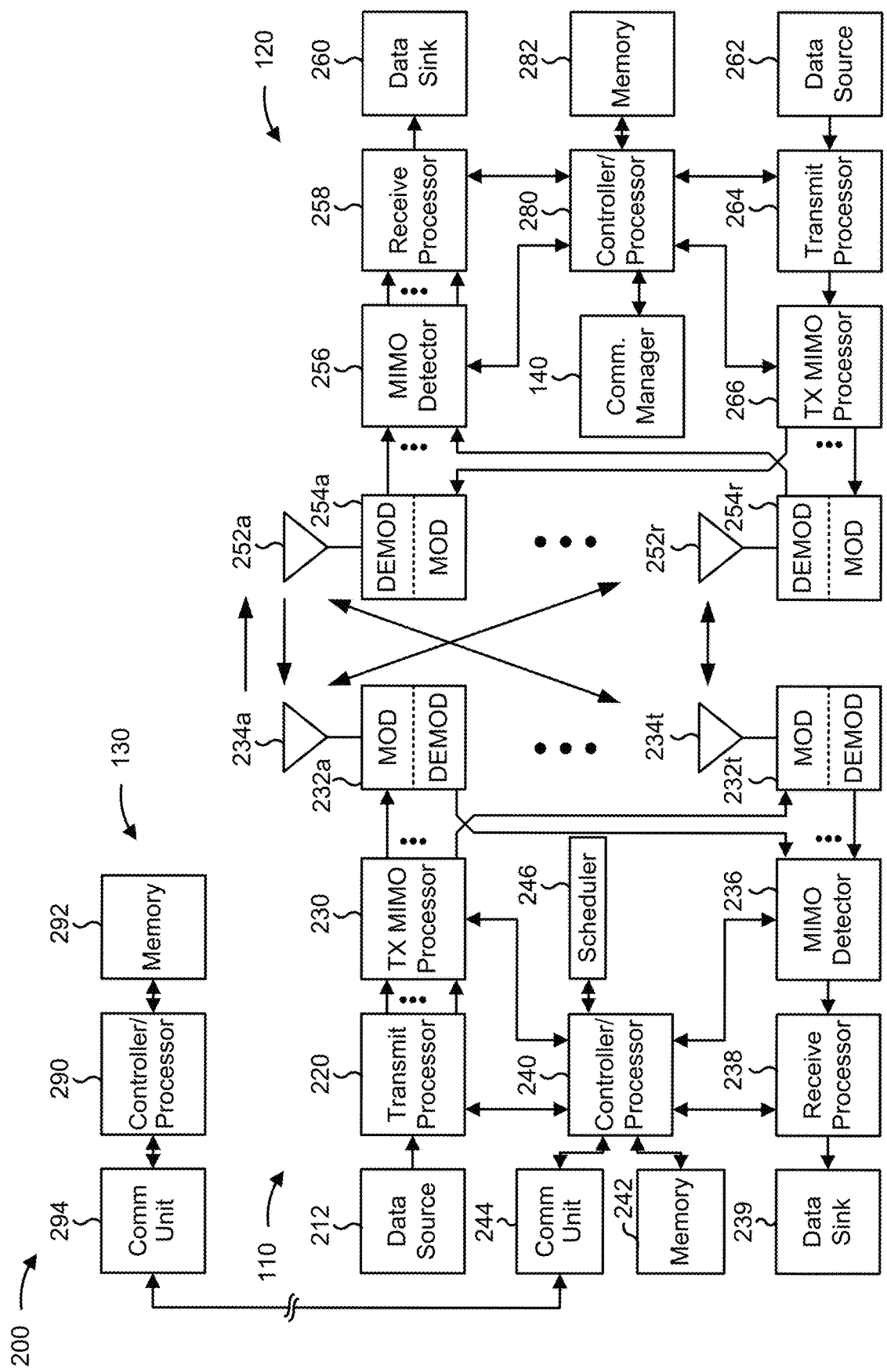
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may provide means for transmitting data or control information, among other examples, to, for example, UE 120. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. The controller/processor 280 may provide, for UE 120, means for determining, identifying, or selecting, among other examples, such as using a determination circuit, an identification circuit, a selection circuit, and/or the like. The receive processor 258 may provide, for UE 120, means for receiving data or control information, among other examples, from, for example, base station 110. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. The transmit processor 264 may provide, for UE 120, means for transmitting data or control information, among other examples, to, for example, base station 110. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide, for base station 110, means for receiving data or control information, among other examples, from, for example, UE 120. Receive processor 238 may provide the decoded data to a data sink 239 and the decoded control information to controller/processor 240. The controller/processor 240 may provide means for, for example, determining, selecting, identifying, or detecting, among other examples. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with resource selection for sidelink coordination information request messages, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 may include means for receiving a configuration of a set of resources for sidelink coordination information requests, means for determining at least one resource for use in transmitting or receiving a sidelink coordination information request message from the set of resources for sidelink coordination information requests, means for transmitting or receiving the sidelink coordination information request message in the at least one resource, means for transmitting or receiving a sidelink coordination information report message in response to the sidelink coordination information request message, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3B:
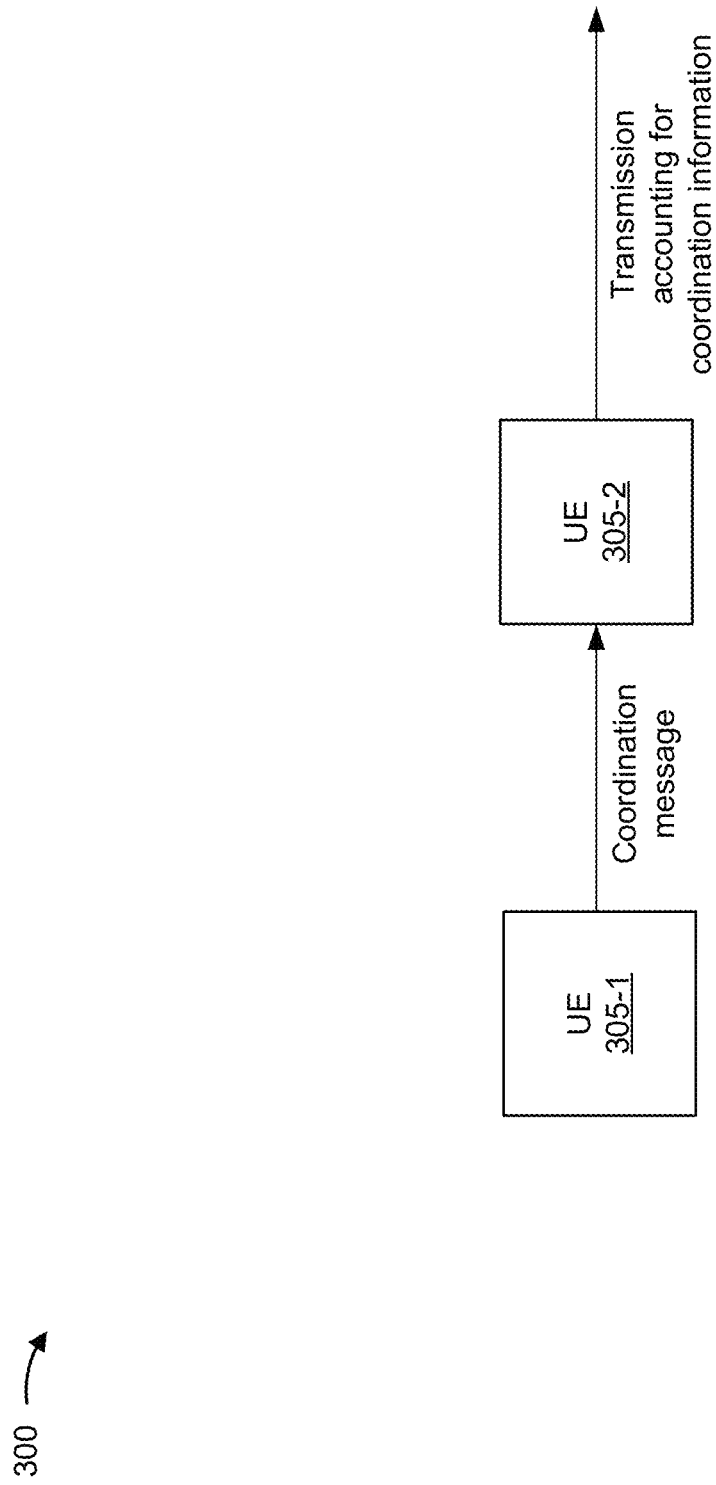

FIGS. 3A and 3B are diagrams illustrating an example 300 of sidelink communications, in accordance with the present disclosure.

As shown in FIG. 3A, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3A, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

FIG. 3B shows coordination signaling between the first UE 305-1 and the second UE 305-2. In particular, the first UE 305-1 may exchange inter-UE coordination signaling with the second UE 305-2. The first UE 305-1 and the second UE 305-2 may operate in an in-coverage mode, a partial coverage mode, an out-of-coverage mode, and/or the like.

In some aspects, the first UE 305-1 may determine a set of sidelink resources available for a resource allocation. The first UE 305-1 may determine the set of sidelink resources based at least in part on determining that the set of sidelink resources are to be selected, or based at least in part on an inter-UE coordination request received from the second UE 305-2 or a base station. In some aspects, the first UE 305-1 may determine the set of sidelink resources based at least in part on a sensing operation, which may be performed before receiving an inter-UE coordination request or after receiving the inter-UE coordination request.

The first UE 305-1 may transmit information (e.g., sidelink inter-UE coordination information) identifying the set of available resources to the second UE 305-2 via inter-UE coordination signaling. The first UE 305-1 may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE 305-2 may select a sidelink resource for a transmission from the second UE 305-2 based at least in part on the set of available resources identified by the first UE 305-1. As shown, the second UE 305-2 may perform the transmission accounting for the coordination information (e.g., via a sidelink resource indicated by the coordination information, and/or the like).

In this way, the inter-UE coordination signaling may reduce resource collisions (e.g., in half duplex operation) between the first UE 305-1, the second UE 305-2, and/or another UE (e.g., a hidden node), which may thereby reduce consecutive packet loss. Moreover, the inter-UE coordination signaling may reduce a power consumption for the first UE 305-1 and/or the second UE 305-2.

As indicated above, FIGS. 3A and 3B are provided as an example. Other examples may differ from what is described with respect to FIGS. 3A and 3B.

Figure 4:
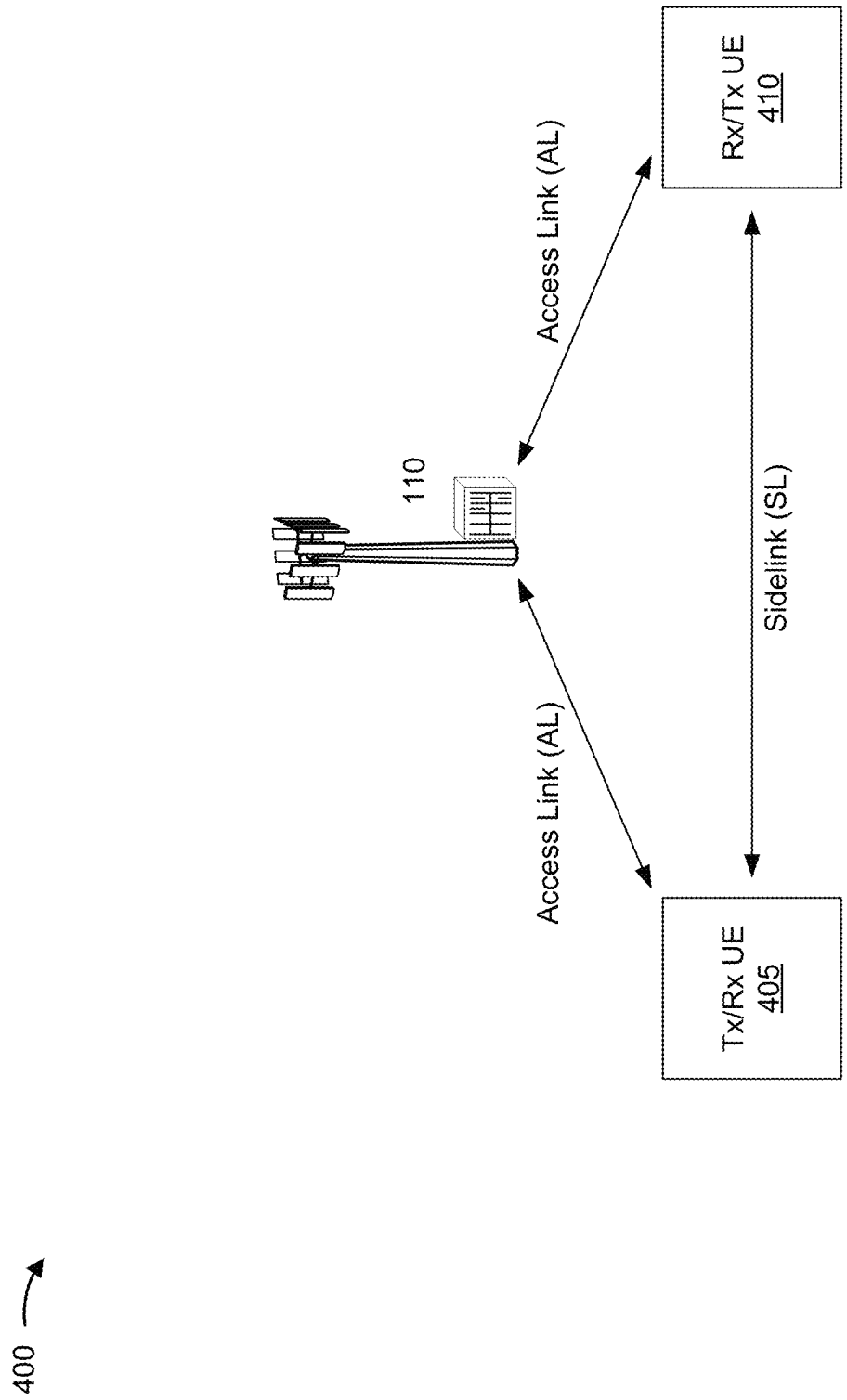
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, a sidelink coordination information request and/or a sidelink coordination information response may be transmitted via the sidelink, as described below. In some aspects, a sidelink coordination information request or a resource assignment may be transmitted via the access link, as described below.

As indicated above, FIG. 4 is provided as an example. Other examples may differ from what is described with respect to FIG. 4.

Figure 5A:
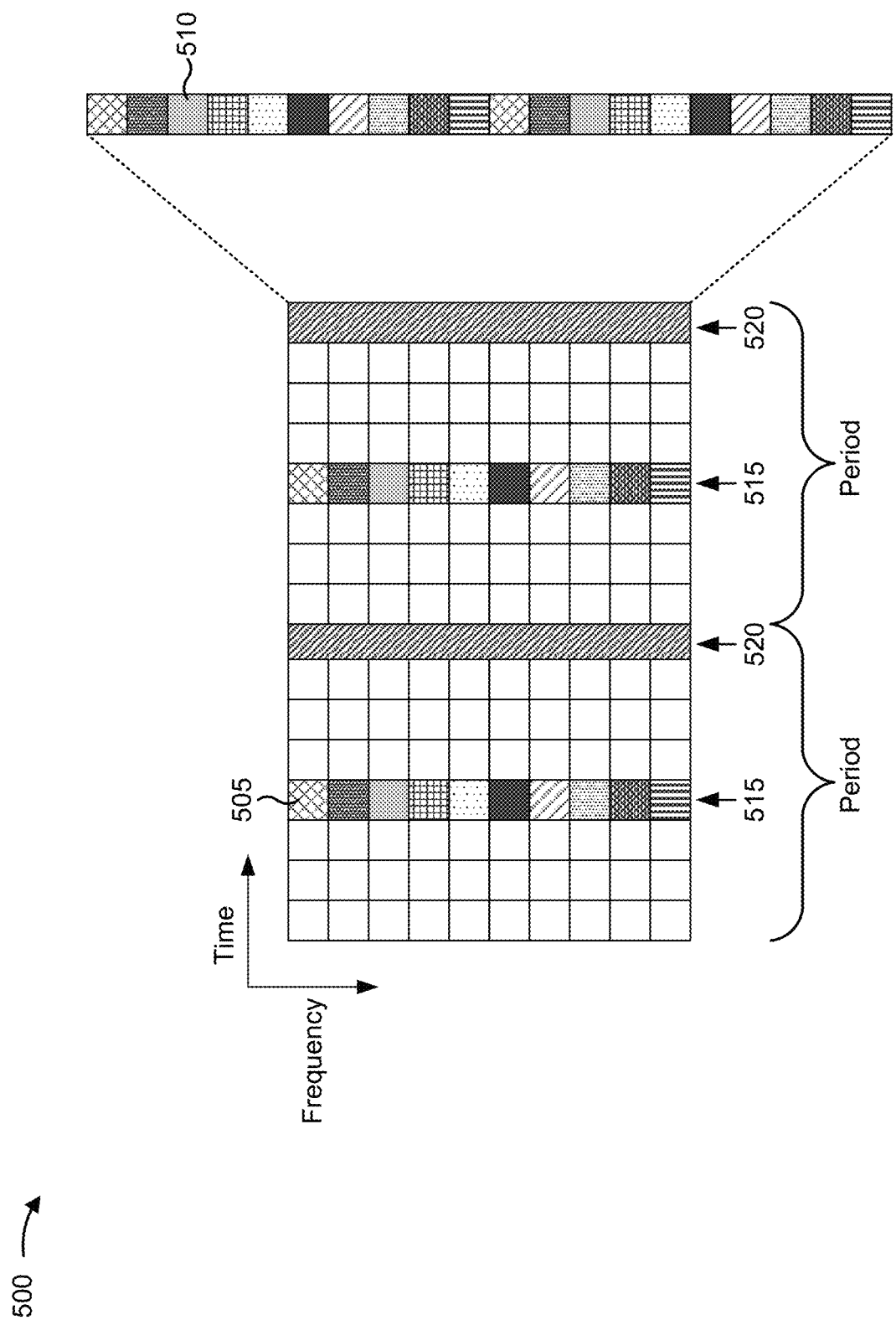
FIGS. 5A and 5B are diagrams illustrating examples of requesting and reporting resources for sidelink inter-UE coordination information, in accordance with the present disclosure.
Figure 5B:
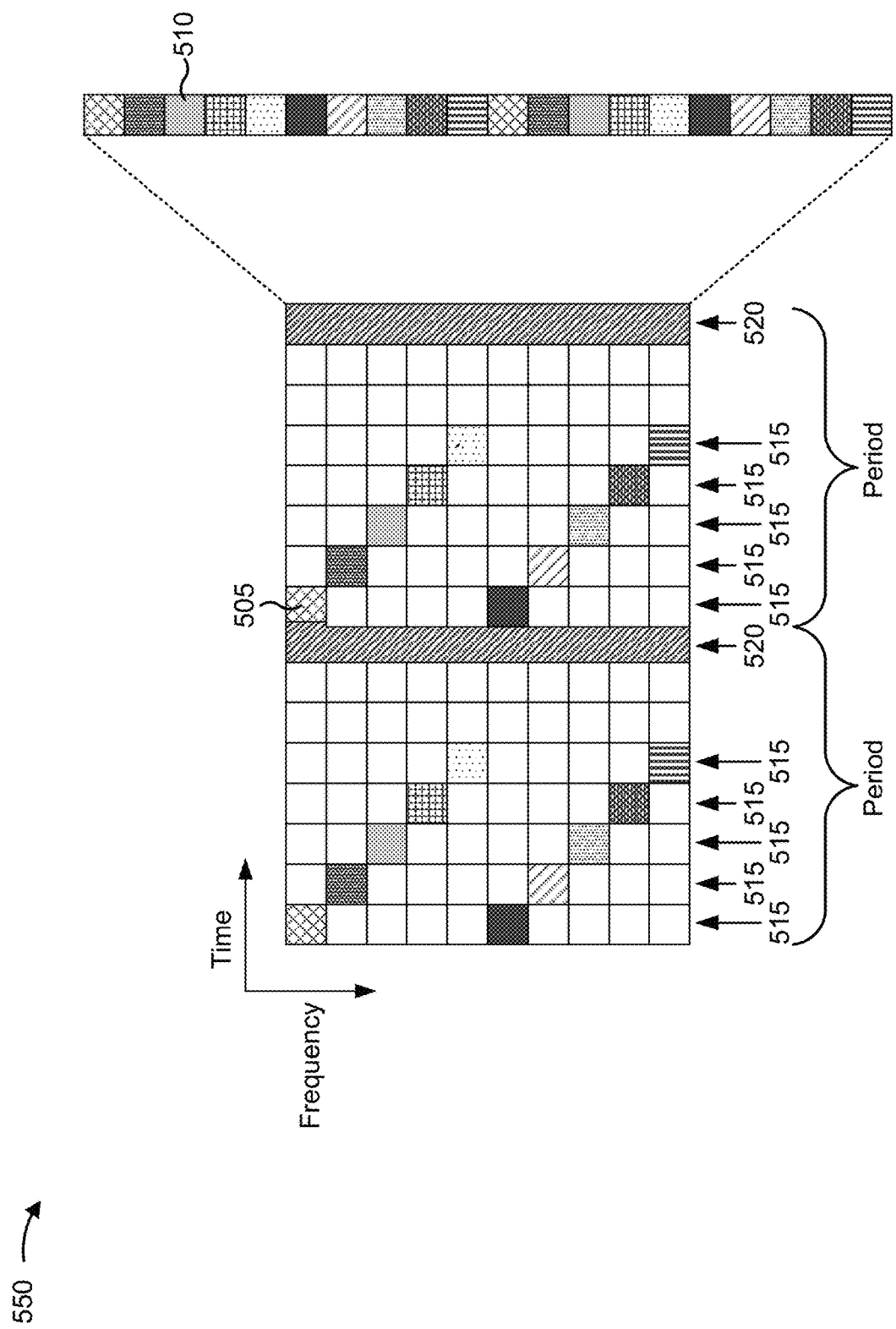

FIGS. 5A and 5B are diagrams illustrating examples 500 and 550 of requesting and reporting resources for sidelink inter-UE coordination information, in accordance with the present disclosure.

A UE engaged in sidelink communication may be configured with resources 505 (e.g., time and/or frequency resources) that are to be used to transmit and/or receive requests for sidelink inter-UE coordination information (which may be referred to as requesting resources), and/or resources 510 (e.g., time and/or frequency resources) that are to be used to transmit and/or receive reports of sidelink inter-UE coordination information (which may be referred to as reporting resources). A requesting resource 505 or a reporting resource 510 may include one or more subchannels (e.g., of a sidelink resource pool) in a frequency domain and one slot in a time domain; however, other configurations are possible. In some aspects, a reporting resource 510 and a requesting resource 505 may differ in size in a frequency domain and/or in a time domain.

The requesting resources 505 and the reporting resources 510 may be configured with a particular periodicity (e.g., the requesting resources 505 and the reporting resources 510 may be configured with the same periodicity or different periodicities). Each periodic occasion of the requesting resources 505 may be referred to as a requesting occasion 515, and each periodic occasion of the reporting resources 510 may be referred to as a reporting occasion 520. The reporting occasions 520 on the right side of FIGS. 5A and 5B are shown enlarged to illustrate the reporting resources 510.

In some aspects, if inter-UE coordination information is requested in a particular requesting occasion 515, then responsive inter-UE coordination information may be reported in the next reporting occasion 520 following the particular requesting occasion 515. That is, a requesting occasion 515 may be associated with a reporting occasion 520 that is to be used for responding to a request for inter-UE coordination information that was transmitted in the requesting occasion 515.

In some aspects, a requesting resource 505 may be mapped to one or more reporting resources 510. For example, in the examples 500 and 550, a requesting resource 505 shown with a particular fill may be mapped to one or more reporting resources 510 shown in the same fill. A UE may be configured with a mapping between requesting resources 505 and reporting resources 510, such as in a sidelink resource pool configuration. The mapping may indicate particular reporting resource(s) 510 that are to be used for responding to a request for inter-UE coordination information that was transmitted in a particular requesting resource 505 (e.g., according to a mapping between the particular requesting resource 505 and the particular reporting resource(s) 510).

In the example 500, the requesting resources 505 may be in a single requesting occasion 515 per period. That is, the requesting resources 505 may be in a single sidelink slot per period. The single requesting occasion 515 may be associated with a single reporting occasion 520 per period.

In the example 550, the requesting resources 505 may be distributed over multiple requesting occasions 515 per period. That is, the requesting resources 505 may be in multiple slots per period. The multiple requesting occasions 515 may be associated with a single reporting occasion 520 per period.

A UE may need to select requesting resources that are to be used for transmitting sidelink inter-UE coordination information requests. In particular, a UE may need to select a requesting resource so as to minimize blind decoding attempts of requesting resources, reduce collision in requesting resources, and/or the like. Some techniques and apparatuses described herein enable selection of requesting resources that are to be used for transmitting sidelink inter-UE coordination information requests and, specifically, to minimize blind decoding attempts of requesting resources, reduce collision in requesting resources, and/or the like. In this way, a performance of requests for sidelink inter-UE coordination information may be improved, wireless resources may be conserved, UE power consumption may be reduced, and/or the like.

As indicated above, FIGS. 5A and 5B are provided as examples. Other examples may differ from what is described with respect to FIGS. 5A and 5B.

Figure 6:
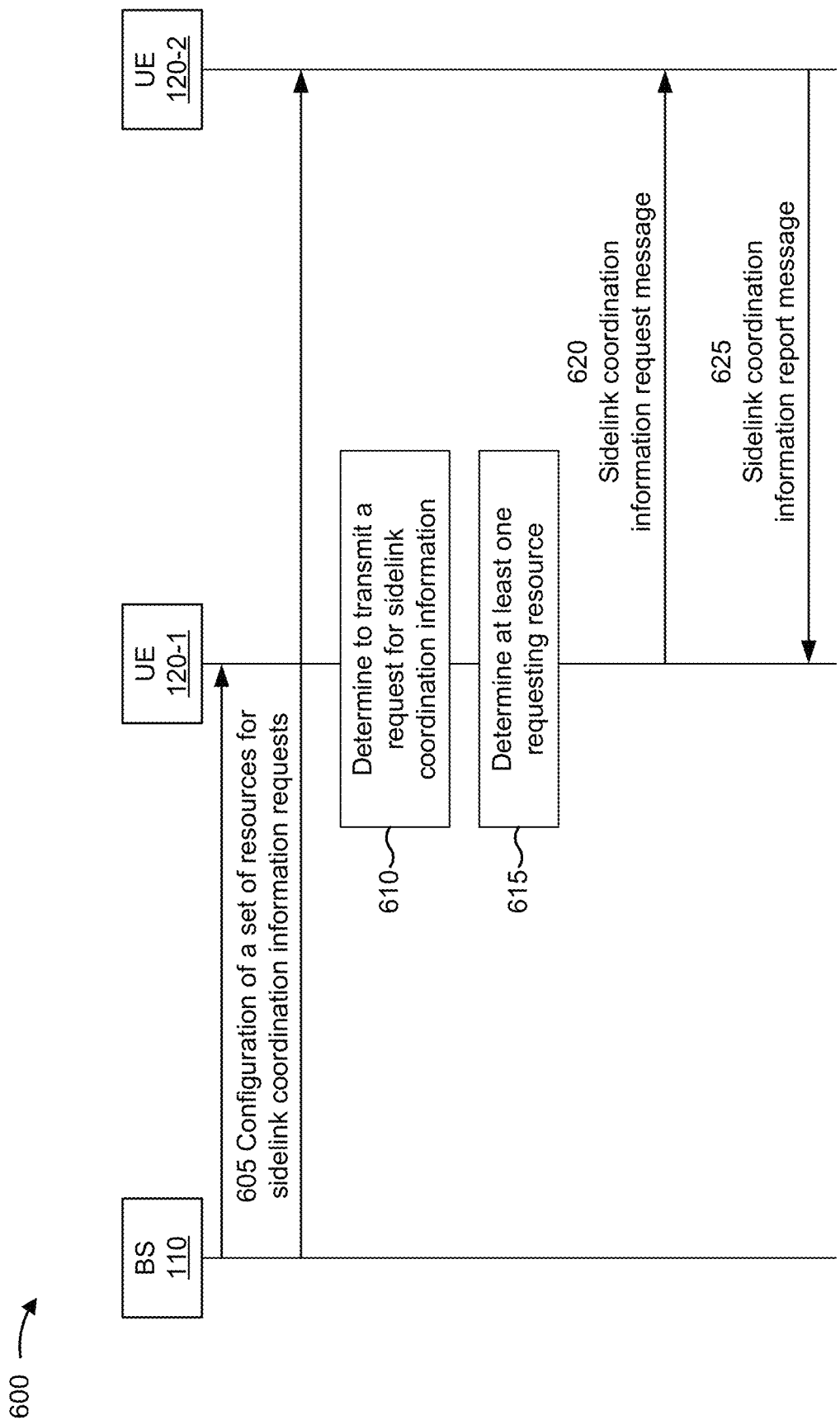
FIG. 6 is a diagram illustrating an example associated with resource selection for sidelink coordination information request messages, in accordance with the present disclosure.

FIG. 6 is a diagram illustrating an example 600 associated with resource selection for sidelink coordination information request messages, in accordance with the present disclosure. As shown in FIG. 6, example 600 includes communication between a BS 110, a first UE 120-1, and a second UE 120-2. In some aspects, the first UE 120-1 and the second UE 120-2 may correspond to a UE 305, a UE 405, a UE 410, and/or the like.

In some aspects, the first UE 120-1 may transmit one or more requests for sidelink inter-UE coordination information and may be referred to herein as a requesting UE 120-1. In some aspects, the second UE 120-2 may transmit one or more reports of sidelink inter-UE coordination information (e.g., in response to a request from the requesting UE 120-1) and may be referred to herein as a reporting UE 120-2. In some aspects, the requesting UE 120-1 may also transmit one or more reports of sidelink coordination information, and the reporting UE 120-2 may also transmit one or more requests for sidelink coordination information, as described herein.

In some aspects, the requesting UE 120-1 and the reporting UE 120-2 may be included in a wireless network, such as wireless network 100. In some aspects, the requesting UE 120-1 and the reporting UE 120-2 may communicate on a wireless sidelink, as described above in connection with FIGS. 3A and 4. As described above, the requesting UE 120-1 and/or the reporting UE 120-2 may be configured with requesting resources for sidelink inter-UE coordination information requests. For example, as shown by reference number 605, the requesting UE 120-1 and/or the reporting UE 120-2 may receive (e.g., from BS 110) a configuration of a set of resources for sidelink coordination information requests.

As shown by reference number 610, the requesting UE 120-1 may determine to transmit a request for sidelink coordination information. For example, the requesting UE 120-1 may determine to transmit the request based at least in part on a determination that the requesting UE 120-1 is experiencing collision of sidelink communications, experiencing sidelink packet loss, and/or the like.

As shown by reference number 615, the requesting UE 120-1 may determine at least one requesting resource for use in transmitting a sidelink coordination information request message (e.g., based at least in part on determining to transmit the request for sidelink coordination information). The requesting UE 120-1 may determine (e.g., select) the requesting resource(s) from a set of resources that are to be used for sidelink coordination information requests (e.g., from the requesting resources configured for the requesting UE 120-1), as described above in connection with FIGS. 5A and 5B.

In some aspects, the set of resources may be in a single requesting occasion (e.g., a single slot) that occurs periodically. In some aspects, the set of resources may be in a group of multiple requesting occasions (e.g., multiple slots) that occur periodically. In some aspects, the requesting resource(s) determined by the requesting UE 120-1 may be in a next requesting occasion after the requesting UE 120-1 determines to transmit the request.

In some aspects, the single requesting occasion, or the group of multiple requesting occasions, may be associated with (e.g., may map to) a reporting occasion (e.g., a slot), such as a reporting occasion that immediately follows the single requesting occasion or the group of multiple requesting occasions. The reporting occasion may include one or more reporting resources for transmitting sidelink coordination information reports. In some aspects, a requesting resource, of the set of resources, may map to one or more reporting resources in the reporting occasion.

In some aspects, the requesting UE 120-1 may determine the requesting resource(s) using a procedure for sensing channel availability, as described above in connection with FIG. 3A. For example, the requesting UE 120-1 may use the sensing procedure to determine one or more requesting resources, of the set of resources, that are available. In some aspects, the requesting UE 120-1 may reserve the requesting resource(s) based at least in part on a determination that the requesting resource(s) are available. For example, the requesting UE 120-1 may transmit SCI that reserves the requesting resource(s) for the requesting UE 120-1. Accordingly, the reporting UE 120-2 may determine the requesting resource(s) being used by the requesting UE 120-1 based at least in part on the SCI. In this way, the requesting UE 120-1 may select and reserve resources for transmitting a request for sidelink coordination information in a manner similar to that used for data transmission in a transmission mode where resource selection and/or scheduling is performed by a UE, as described above in connection with FIG. 3A.

In some aspects, the requesting UE 120-1 may determine the requesting resource(s) at random. For example, the requesting UE 120-1 may randomly select the requesting resource(s) from the set of resources. Here, the reporting UE 120-2 may attempt to decode transmissions in each resource, of the set of resources, since the reporting UE 120-2 lacks information on the requesting resource(s) being used by the requesting UE 120-1.

In some aspects, each resource of the set of resources may be assigned a respective index value. In some aspects, when the set of resources are in a single requesting occasion that maps to a single reporting occasion, as described above, the set of resources may be consecutively indexed (e.g., in a frequency domain) within the single requesting occasion. In some aspects, when the set of resources are in a group of multiple requesting occasions that map to a single reporting occasion, as described above, the set of resources may be consecutively indexed (e.g., in a frequency domain) across the multiple requesting occasions. For example, resources(s) in a first requesting occasion of the group may be consecutively indexed starting from an initial index value (e.g., 0), resources(s) in a second requesting occasion of the group may be consecutively indexed starting from an index value that follows the last index value used for the first requesting occasion, and so forth. As an example, if each requesting occasion of the group includes three resources, then the resources in the first requesting occasion may be indexed 0 to 2, the resources in the second requesting occasion may be indexed 3 to 5, and so forth.

In some aspects, when the set of resources are in a group of multiple requesting occasions that maps to a single reporting occasion, as described above, the set of resources may be consecutively indexed (e.g., in a frequency domain) within each requesting occasion of the group (e.g., each requesting occasion of the group is consecutively indexed independently). For example, resources(s) in a first requesting occasion of the group may be consecutively indexed starting from an initial index value (e.g., 0), resources(s) in a second requesting occasion of the group may be consecutively indexed starting from the initial index value, and so forth. As an example, if each requesting occasion of the group includes three resources, then the resources in the first requesting occasion may be indexed 0 to 2, the resources in the second requesting occasion may be indexed 0 to 2, and so forth. A resource in the first requesting occasion and a resource in the second requesting occasion that are associated with the same index value may be mapped to different resources of the single reporting occasion.

In some aspects, the requesting UE 120-1 may determine the requesting resource(s), according to the indexing, and based at least in part on an identifier of the requesting UE 120-1, an identifier of the reporting UE 120-2 (e.g., which is to receive the sidelink coordination information request message of the requesting UE 120-1), an identifier of another UE, and/or the like. For example, the requesting UE 120-1 may determine the requesting resource(s) based at least in part on a source identifier associated with the sidelink coordination information request message, a destination identifier associated with the sidelink coordination information request message, and/or the like. In some aspects, the requesting UE 120-1 may use destination identifiers to determine the requesting resources when the requesting UE 120-1 is transmitting sidelink coordination information request messages to multiple other UEs (e.g., multiple other UEs associated with the same groupcast session as the requesting UE 120-1, and which are therefore known to the requesting UE 120-1).

Specifically, the requesting UE 120-1 may determine the requesting resource(s), according to the indexing, and based at least in part on an identifier (e.g., the source identifier of the requesting UE 120-1, the destination identifier of the reporting UE 120-2, and/or the like) and a quantity of resources associated with a requesting occasion from which the requesting UE 120-1 is selecting the requesting resource(s) (e.g., a quantity of resources that are available for transmitting a request at a given time). For example, the requesting UE 120-1 may determine an index value of a requesting resource that is to be used by the requesting UE 120-1 by determining a modulo of the identifier and the quantity of resources associated with the requesting occasion (e.g., index value=the source identifier modulo the quantity of resources; index value=the destination identifier modulo the quantity of resources; and/or the like). As described above, the quantity of resources associated with the requesting occasion may correspond to the quantity of resources in the set of resources (e.g., when the set of resources are in a single requesting occasion), or may be less than the quantity of resources in the set of resources (e.g., when the set of resources are in a group of multiple requesting occasions).

In some aspects, the requesting UE 120-1 may determine the requesting resource(s) according to a periodicity of requesting occasions and/or a periodicity of reporting occasions. For example, the requesting UE 120-1 may determine an index value of a requesting resource that is to be used by the requesting UE 120-1 based at least in part on (e.g., as a function of) the periodicity of requesting occasions and/or the periodicity of reporting occasions. A periodicity may be a quantity of slots, a quantity of symbols, or another time interval, at which a single reporting or requesting occasion repeats or at which a group of multiple reporting or requesting occasions repeat.

It may be possible that the requesting UE 120-1 and another UE that is selecting a requesting resource from the same requesting occasion may select the same requesting resource, thereby resulting in collision of sidelink coordination information request messages. For example, the requesting UE 120-1 and the other UE may determine the requesting resource using the same source identifier, the same destination identifier, or different identifiers that result in the same modulo of the quantity of resources in the requesting occasion.

In some aspects, resource assignments for a sidelink group of UEs (e.g., which may include the requesting UE 120-1 and at least one other UE) may be managed in order to avoid collision of sidelink coordination information request messages within the sidelink group of UEs. For example, the resource assignments may be managed by a manager node, which may be a base station, a relay, a UE of the sidelink group of UEs (e.g., the requesting UE 1201-1), and/or the like. The manager node may determine resource assignments, of the set of resources, for one or more UEs of the sidelink group of UEs to avoid collision of sidelink coordination information request messages. For example, the manager node may assign different resources of the set of resources to the requesting UE 120-1 and another UE that is in the sidelink group of UEs with the requesting UE 120-1. In some aspects, the manager node may transmit, and the requesting UE 120-1 may receive, an indication of a resource assignment that includes the requesting resource(s) of the set of resources that are to be used by the requesting UE 120-1. The requesting UE 120-1 may determine the requesting resource(s) that are to be used for transmitting the sidelink coordination information request message based at least in part on the indication.

In some aspects, the indexing of the set of resources, as described above, may change over time (e.g., change relative to a consecutive indexing) in order to avoid collision of sidelink coordination information request messages. Moreover, the indexing of the set of resources, in a requesting occasion, may be different for different UEs (e.g., may be different for the requesting UE 120-1 and another UE). Thus, for example, in a first requesting occasion (e.g., in a period), the set of resources may be associated with a first indexing for the requesting UE 120-1 and a second indexing for another UE, in a second requesting occasion (e.g., in a next period), the set of resources may be associated with a third indexing for the requesting UE 120-1 and a fourth indexing for the other UE, and so forth.

The indexing of the set of resources may change as a function of time, as a function of an identifier of a UE, in accordance with a defined pattern, and/or the like. In some aspects, the reporting UE 120-2 may receive an indication of a change in an indexing (e.g., relative to a consecutive indexing) of the set of resources. In some aspects, the requesting UE 120-1 and/or the reporting UE 120-2 may be configured with information that identifies a manner in which the indexing of the set of resources is to change (e.g., as a function of time, as a function of an identifier of a UE, in accordance with a defined pattern, and/or the like).

In some aspects, the requesting UE 120-1 may determine the requesting resource(s) as a function of an identifier of the requesting UE 120-1 (e.g., the source identifier for the sidelink coordination information request message) or an identifier of another UE, such as the reporting UE 120-2 (e.g., the destination identifier for the sidelink coordination information request message). That is, rather than using the full identifier, as described above, the requesting UE 120-1 may use an output of a function of the identifier (e.g., when determining an index value of a requesting resource that is to be used, as described above). In some aspects, the requesting UE 120-1 may determine the requesting resource(s) based at least in part on an identifier (e.g., the source identifier of the requesting UE 120-1, the destination identifier of the reporting UE 120-2, and/or the like) and as a function of time. For example, the output of the function of the identifier may change with time.

As an example, the requesting UE 120-1 may determine the requesting resource(s) using a set of most-significant bits (MSBs) of an identifier (e.g., the source identifier of the requesting UE 120-1, the destination identifier of the reporting UE 120-2, and/or the like) in even-indexed requesting occasions, and a set of least-significant bits (LSBs) of an identifier in odd-indexed requesting occasions (or the set of MSBs in odd-indexed requesting occasions and the set of LSBs in even-indexed requesting occasions). Thus, the requesting UE 120-1 may determine an index value of a requesting resource that is to be used by determining a modulo of the set of bits of the identifier and the quantity of resources in a requesting occasion (e.g., index value=MSBs/LSBs modulo the quantity of resources).

As another example, the requesting UE 120-1 may determine the requesting resource(s) based at least in part on combining (e.g., multiplying, summing, and/or the like) an identifier (e.g., the source identifier of the requesting UE 120-1, the destination identifier of the reporting UE 120-2, and/or the like) with a random value. Thus, the requesting UE 120-1 may determine an index value for a requesting resource that is to be used by determining a modulo of the combination of the identifier and the random value and the quantity of resources in a requesting occasion (e.g., index value=the combination modulo the quantity of resources). In some aspects, the reporting UE 120-2 may be configured with information identifying an initial seed for generating the random value, which the reporting UE 120-2 may use to determine requesting resource(s) that may be selected by the requesting UE 120-1 for transmitting the sidelink coordination information request message.

In some aspects, the reporting UE 120-2 may also determine the requesting resource(s) that are to be used by the requesting UE 120-1 for transmitting the sidelink coordination information request message (e.g., the requesting resource(s) in which the reporting UE 120-2 is to receive the sidelink coordination information request message). For example, the reporting UE 120-2 may determine the requesting resource(s) based at least in part on an identifier (e.g., the source identifier of the requesting UE 120-1, the destination identifier of the reporting UE 120-2, and/or the like), a function of the identifier, a combination of the identifier and a random value, a quantity of resources associated with a requesting occasion, a periodicity of requesting occasions and/or a periodicity of reporting occasions, and/or the like, as described above. In this way, decoding attempts in the set of resources may be reduced at the reporting UE 120-2.

As shown by reference number 620, the requesting UE 120-1 may transmit, and the reporting UE 120-2 (and/or one or more other UEs) may receive, one or more sidelink coordination information request messages. The requesting UE 120-1 may transmit the one or more sidelink coordination information request messages (e.g., in a sidelink channel) in the requesting resource(s) determined by the requesting UE 120-1, as described above.

In some aspects, the reporting UE 120-2 may receive a sidelink coordination information request message from the requesting UE 120-1 (e.g., in the requesting resource(s) determined by the reporting UE 120-2, as described above), and as shown by reference number 625, the reporting UE 120-2 may respond with a sidelink coordination information report message (e.g., the reporting UE 120-2 may transmit, and the requesting UE 120-1 may receive, the sidelink coordination information report message). The sidelink coordination information report message may include sidelink inter-UE coordination information, such as information that assists the requesting UE 120-1 in selecting resources for sidelink communication. For example, the sidelink coordination information report message (e.g., a sidelink inter-UE coordination signal) may identify resources selected by the reporting UE 120-2 for a transmission of the requesting UE 120-1. That is, the reporting UE 120-2 (e.g., a helping UE) may schedule the requesting UE 120-1 via the sidelink coordination information.

The reporting UE 120-2 may transmit the sidelink coordination information report message in one or more reporting resources of a reporting occasion. As described above, the reporting resource(s), used by the reporting UE 120-2 to respond to the sidelink coordination information request message transmitted by the requesting UE 120-1, may be mapped to the requesting resource(s) used by the requesting UE 120-1. In addition, as described above, the reporting occasion used by the reporting UE 120-2 may be associated with the requesting occasion used by the requesting UE 120-1. For example, the reporting occasion may be a next reporting occasion that follows the requesting occasion.

In this way, requesting resources may be selected, and requests for inter-UE sidelink coordination information may be responded to, so as to minimize blind decoding attempts of requesting resources, reduce collision in requesting resources, and/or the like. In this way, performance of sidelink inter-UE coordination information requests and reports may be improved, wireless resources may be conserved, UE power consumption may be reduced, and/or the like.

As indicated above, FIG. 6 is provided as an example. Other examples may differ from what is described with respect to FIG. 6.

Figure 7:
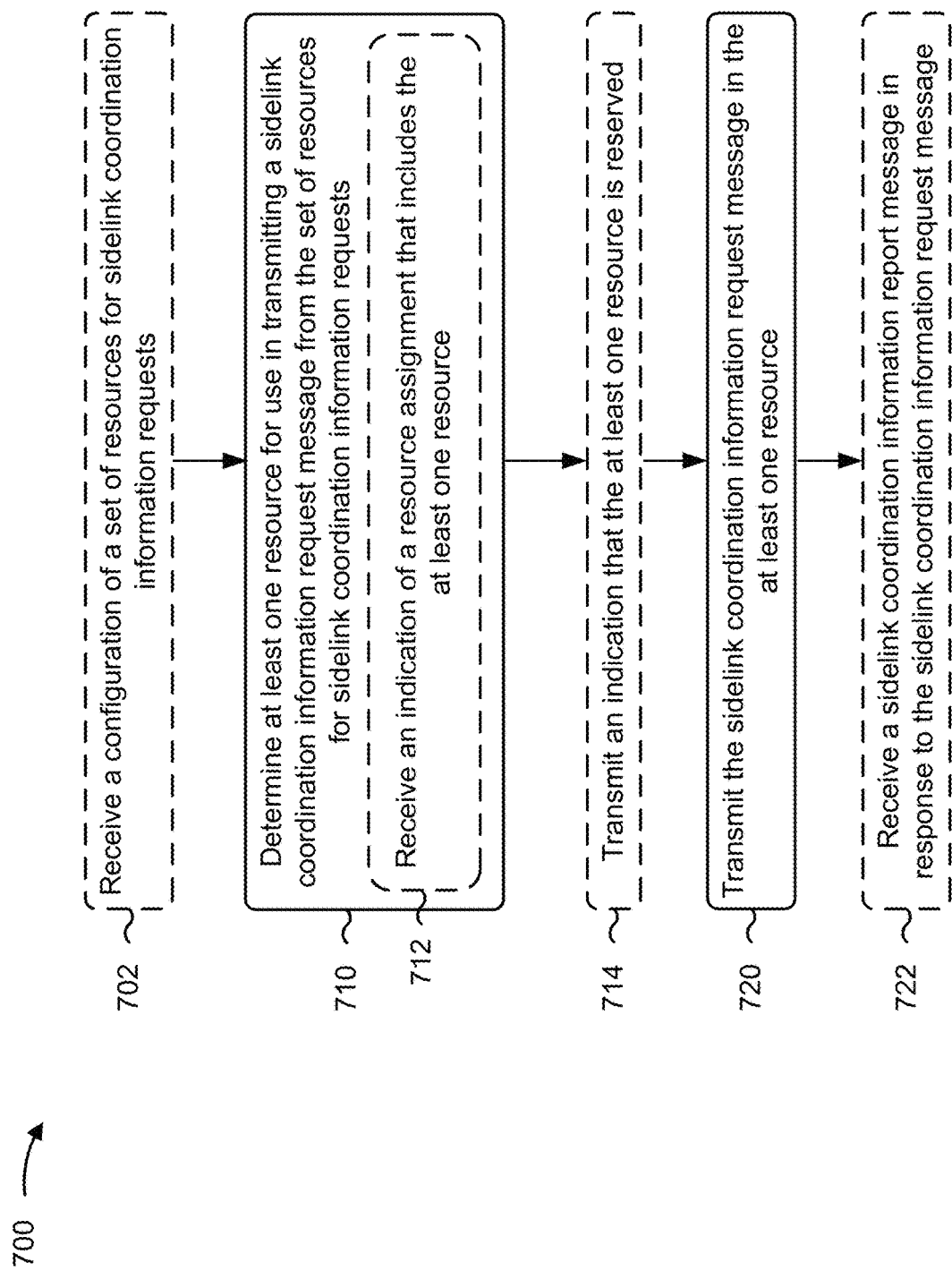
FIG. 7 is a diagram illustrating an example process associated with resource selection for sidelink coordination information request messages, in accordance with the present disclosure.

FIG. 7 is a diagram illustrating an example process 700 performed, for example, by a UE, in accordance with the present disclosure. Example process 700 is an example where the UE (e.g., UE 120) performs operations associated with resource selection for sidelink coordination information request messages.

In some aspects, process 700 may include receiving a configuration of a set of resources for sidelink coordination information requests (block 702). For example, the UE (e.g., using antenna 252, DEMOD 254, MIMO detector 256, receive processor 258, controller/processor 280, memory 282, and/or reception component 902) may receive a configuration of a set of resources for sidelink coordination information requests, as described above.

As shown in FIG. 7, in some aspects, process 700 may include determining at least one resource for use in transmitting a sidelink coordination information request message from the set of resources for sidelink coordination information requests (block 710). For example, the UE (e.g., using controller/processor 280, memory 282, and/or determination component 910) may determine at least one resource for use in transmitting a sidelink coordination information request message from the set of resources for sidelink coordination information requests, as described above.

In some aspects, process 700 may include receiving an indication of a resource assignment that includes the at least one resource (block 712). For example, the UE (e.g., using antenna 252, DEMOD 254, MIMO detector 256, receive processor 258, controller/processor 280, memory 282, and/or reception component 902) may receive an indication of a resource assignment that includes the at least one resource, as described above.

In some aspects, process 700 may include transmitting an indication that the at least one resource is reserved (block 714). For example, the UE (e.g., using transmit processor 264, TX MIMO processor 266, MOD 254, antenna 252, controller/processor 280, memory 282, and/or transmission component 906) may transmit an indication that the at least one resource is reserved for the UE, as described above.

As further shown in FIG. 7, in some aspects, process 700 may include transmitting the sidelink coordination information request message in the at least one resource (block 720). For example, the UE (e.g., using transmit processor 264, TX MIMO processor 266, MOD 254, antenna 252, controller/processor 280, memory 282, and/or transmission component 906) may transmit the sidelink coordination information request message in the at least one resource, as described above.

In some aspects, process 700 may include receiving a sidelink coordination information report message in response to the sidelink coordination information request message (block 722). For example, the UE (e.g., using antenna 252, DEMOD 254, MIMO detector 256, receive processor 258, controller/processor 280, memory 282, and/or reception component 902) may receive a sidelink coordination information report message in response to the sidelink coordination information request message, as described above.

Process 700 may include additional aspects, such as any single aspect or any combination of aspects described below and/or in connection with one or more other processes described elsewhere herein.

In a first aspect, the at least one resource is determined using a procedure for sensing channel availability.

In a second aspect, alone or in combination with the first aspect, process 700 includes transmitting an indication that the at least one resource is reserved for the UE.

In a third aspect, alone or in combination with one or more of the first and second aspects, the at least one resource is randomly determined.

In a fourth aspect, alone or in combination with one or more of the first through third aspects, the at least one resource is determined based at least in part on an identifier of the UE.

In a fifth aspect, alone or in combination with one or more of the first through fourth aspects, the at least one resource is determined based at least in part on an identifier of another UE that is to respond to the sidelink coordination information request message.

In a sixth aspect, alone or in combination with one or more of the first through fifth aspects, the set of resources for sidelink coordination information requests are in a single requesting occasion that maps to a single reporting occasion.

In a seventh aspect, alone or in combination with one or more of the first through sixth aspects, the set of resources for sidelink coordination information requests are consecutively indexed within the single requesting occasion.

In an eighth aspect, alone or in combination with one or more of the first through seventh aspects, the set of resources for sidelink coordination information requests are in multiple requesting occasions that map to a single reporting occasion.

In a ninth aspect, alone or in combination with one or more of the first through eighth aspects, the set of resources for sidelink coordination information requests are consecutively indexed across the multiple requesting occasions.

In a tenth aspect, alone or in combination with one or more of the first through ninth aspects, the set of resources for sidelink coordination information requests are consecutively indexed within a single requesting occasion of the multiple requesting occasions.

In an eleventh aspect, alone or in combination with one or more of the first through tenth aspects, a first resource in a first requesting occasion of the multiple requesting occasions and a second resource in a second requesting occasion of the multiple requesting occasions are associated with a same index value and different resources of the single reporting occasion.

In a twelfth aspect, alone or in combination with one or more of the first through eleventh aspects, different resources of the set of resources for sidelink coordination information requests are assigned to the UE and another UE that is in a group with the UE.

In a thirteenth aspect, alone or in combination with one or more of the first through twelfth aspects, process 700 includes receiving an indication of a resource assignment that includes the at least one resource.

In a fourteenth aspect, alone or in combination with one or more of the first through thirteenth aspects, an indexing of the set of resources for sidelink coordination information requests changes over time.

In a fifteenth aspect, alone or in combination with one or more of the first through fourteenth aspects, an indexing of the set of resources for sidelink coordination information requests in a requesting occasion is different for the UE and another UE.

In a sixteenth aspect, alone or in combination with one or more of the first through fifteenth aspects, the at least one resource is determined as a function of time and based at least in part on an identifier of the UE or an identifier of another UE that is to respond to the sidelink coordination information request message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
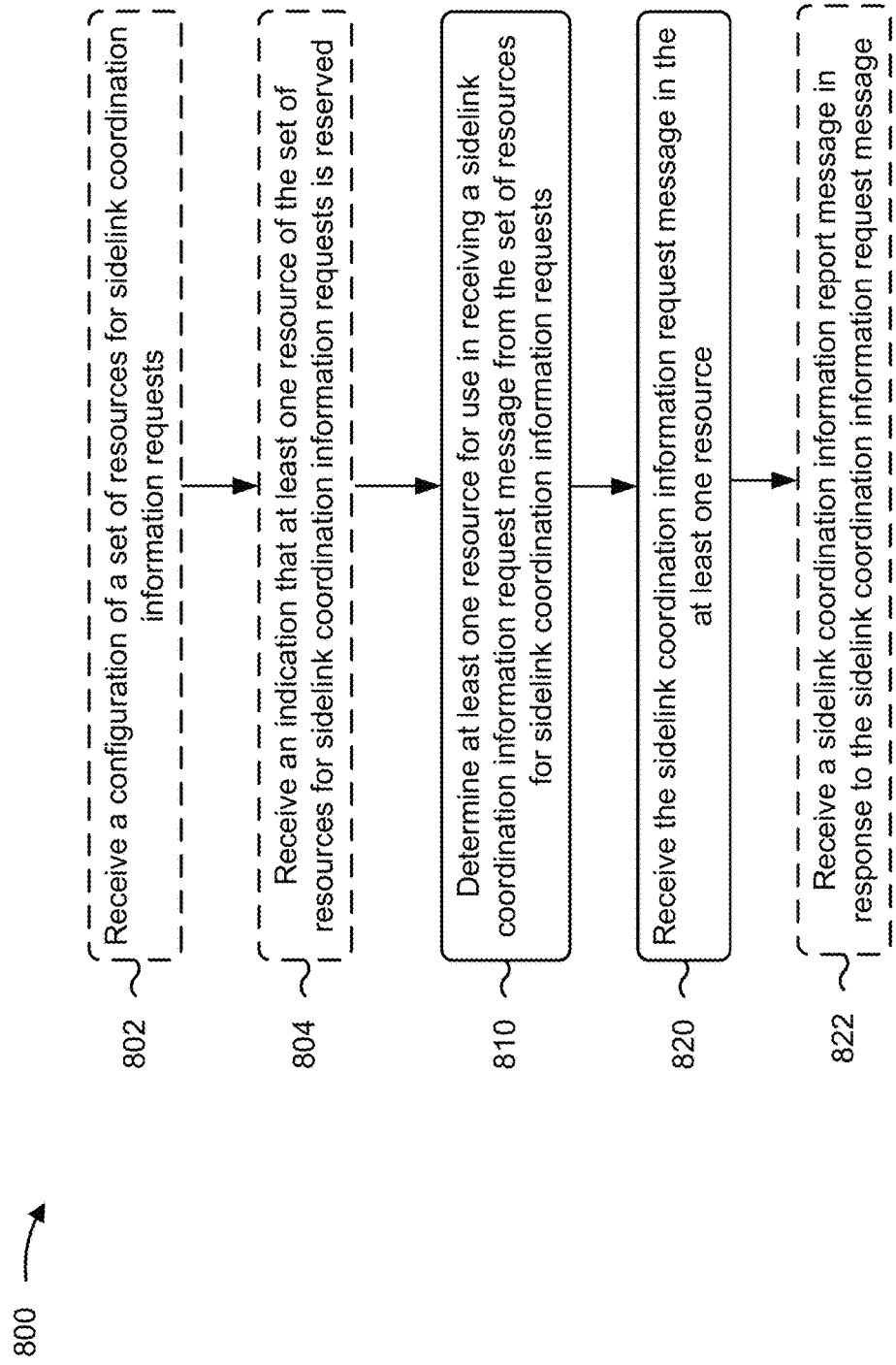
FIG. 8 is a diagram illustrating an example process associated with resource selection for sidelink coordination information request messages, in accordance with the present disclosure.

FIG. 8 is a diagram illustrating an example process 800 performed, for example, by a UE, in accordance with the present disclosure. Example process 800 is an example where the UE (e.g., UE 120) performs operations associated with resource selection for sidelink.

In some aspects, process 800 may include receiving a configuration of a set of resources for sidelink coordination information requests (block 802). For example, the UE (e.g., using antenna 252, DEMOD 254, MIMO detector 256, receive processor 258, controller/processor 280, memory 282, and/or reception component 902) may receive a configuration of a set of resources for sidelink coordination information requests, as described above.

In some aspects, process 800 may include receiving an indication that at least one resource of the set of resources is reserved (block 804). For example, the UE (e.g., using antenna 252, DEMOD 254, MIMO detector 256, receive processor 258, controller/processor 280, memory 282, and/or reception component 902) may receive an indication that at least one resource of the set of resources is reserved, as described above.

As shown in FIG. 8, in some aspects, process 800 may include determining at least one resource for use in receiving a sidelink coordination information request message from a set of resources for sidelink coordination information requests (block 810). For example, the UE (e.g., using controller/processor 280, memory 282, and/or determination component 910) may determine at least one resource for use in receiving a sidelink coordination information request message from a set of resources for sidelink coordination information requests, as described above.

As further shown in FIG. 8, in some aspects, process 800 may include receiving the sidelink coordination information request message in the at least one resource (block 820). For example, the UE (e.g., using antenna 252, DEMOD 254, MIMO detector 256, receive processor 258, controller/processor 280, memory 282, and/or reception component 902) may receive the sidelink coordination information request message in the at least one resource, as described above.

In some aspects, process 800 may include transmitting a sidelink coordination information report message in response to the sidelink coordination information request message (block 822). For example, the UE (e.g., using transmit processor 264, TX MIMO processor 266, MOD 254, antenna 252, controller/processor 280, memory 282, and/or transmission component 906) may transmit a sidelink coordination information report message in response to the sidelink coordination information request message, as described above.

Process 800 may include additional aspects, such as any single aspect or any combination of aspects described below and/or in connection with one or more other processes described elsewhere herein.

In a first aspect, process 800 includes receiving an indication that the at least one resource is reserved.

In a second aspect, alone or in combination with the first aspect, process 1100 includes decoding transmissions in each resource of the set of resources.

In a third aspect, alone or in combination with one or more of the first and second aspects, the at least one resource is determined based at least in part on an identifier of another UE that is to transmit the sidelink coordination information request message.

In a fourth aspect, alone or in combination with one or more of the first through third aspects, the at least one resource is determined based at least in part on an identifier of the UE.

In a fifth aspect, alone or in combination with one or more of the first through fourth aspects, the set of resources for sidelink coordination information requests are in a single requesting occasion that maps to a single reporting occasion.

In a sixth aspect, alone or in combination with one or more of the first through fifth aspects, the set of resources for sidelink coordination information requests are consecutively indexed within the single requesting occasion.

In a seventh aspect, alone or in combination with one or more of the first through sixth aspects, the set of resources for sidelink coordination information requests are in multiple requesting occasions that map to a single reporting occasion.

In an eighth aspect, alone or in combination with one or more of the first through seventh aspects, the set of resources for sidelink coordination information requests are consecutively indexed across the multiple requesting occasions.

In a ninth aspect, alone or in combination with one or more of the first through eighth aspects, the set of resources for sidelink coordination information requests are consecutively indexed within a single requesting occasion of the multiple requesting occasions.

In a tenth aspect, alone or in combination with one or more of the first through ninth aspects, a first resource in a first requesting occasion of the multiple requesting occasions and a second resource in a second requesting occasion of the multiple requesting occasions are associated with a same index value and different resources of the single reporting occasion.

In an eleventh aspect, alone or in combination with one or more of the first through tenth aspects, different resources of the set of resources for sidelink coordination information requests are assigned to another UE that is to transmit the sidelink coordination request message and an additional UE that is in a group with the other UE.

In a twelfth aspect, alone or in combination with one or more of the first through eleventh aspects, an indexing of the set of resources for sidelink coordination information requests changes over time.

In a thirteenth aspect, alone or in combination with one or more of the first through twelfth aspects, an indexing of the set of resources for sidelink coordination information requests in a requesting occasion is different for the UE and another UE.

In a fourteenth aspect, alone or in combination with one or more of the first through thirteenth aspects, the at least one resource is determined as a function of time and based at least in part on an identifier of the UE or an identifier of another UE that is to transmit the sidelink coordination information request message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
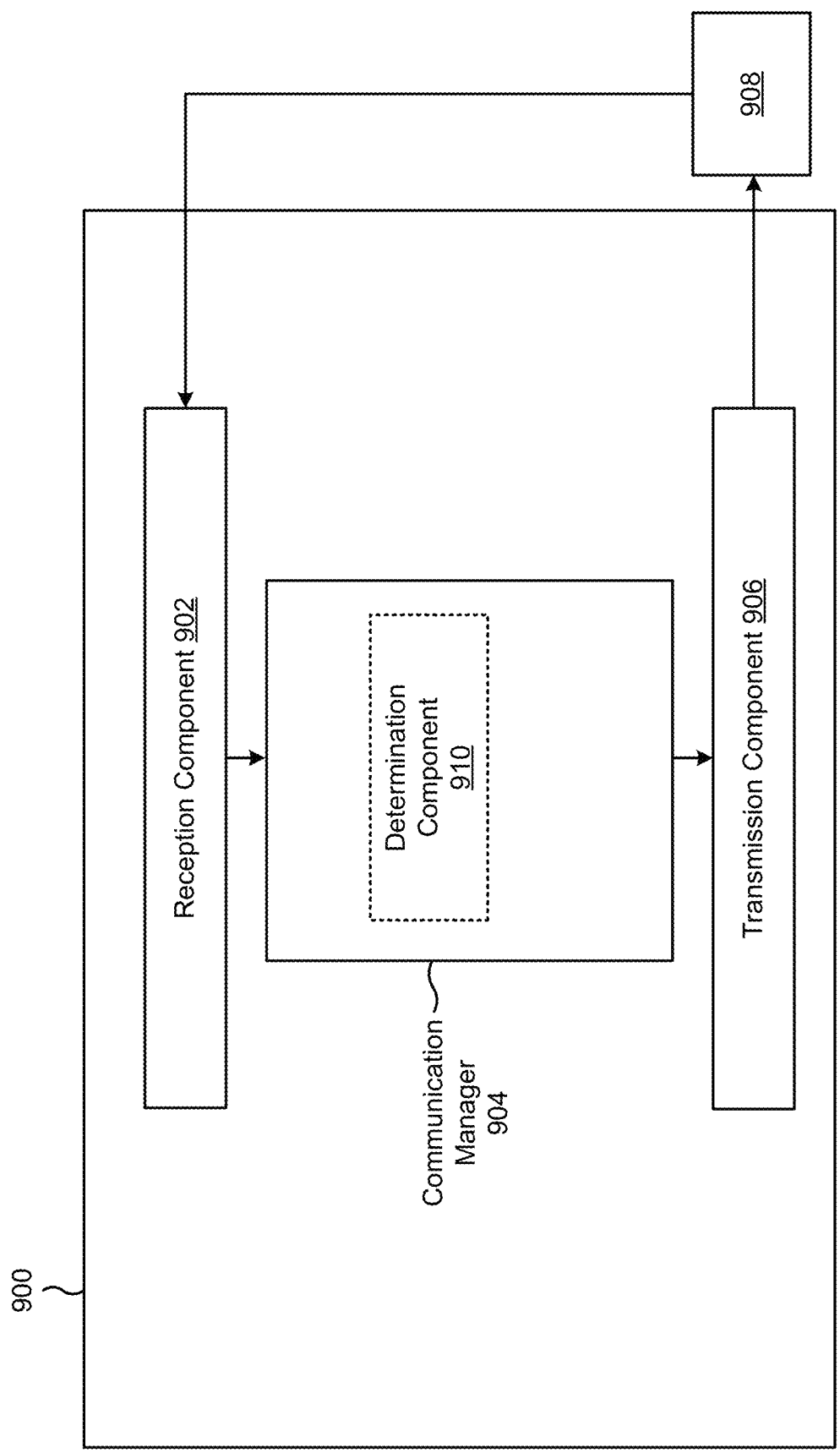
FIG. 9 is a block diagram of an example apparatus for wireless communication, in accordance with the present disclosure.

FIG. 9 is a block diagram of an example apparatus 900 for wireless communication in accordance with the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIG. 6. Additionally or alternatively, the apparatus 900 may be configured to perform one or more processes described herein, such as process 700 of FIG. 7, process 800 of FIG. 8, or a combination thereof. In some aspects, the apparatus 900 may include one or more components of the UE described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

In some aspects, the communication manager 904 may provide means for receiving a configuration of a set of resources for sidelink coordination information requests. In some aspects, the communication manager 904 may provide means for determining at least one resource for use in transmitting or receiving a sidelink coordination information request message from a set of resources for sidelink coordination information requests. In some aspects, the communication manager 904 may provide means for transmitting, or may cause the transmission component 906 to transmit, the sidelink coordination information request message in the at least one resource. In some aspects, the communication manager 904 may provide means for receiving, or may cause the reception component 902 to receive, the sidelink coordination information request message in the at least one resource. In some aspects, the communication manager 904 may provide means for transmitting, or may cause the transmission component 906 to transmit, a sidelink coordination information report message in response to the sidelink coordination information request message. In some aspects, the communication manager 904 may provide means for receiving, or may cause the reception component 902 to receive, a sidelink coordination information report message in response to the sidelink coordination information request message. In some aspects, the communication manager 904 may correspond to, or may include, the communication manager 140. In some aspects, the communication manager 904 may include a controller/processor, a memory, or a combination thereof, of the UE described above in connection with FIG. 2.

In some aspects, the communication manager 904 may include a set of components, such as a determination component 910. Alternatively, the set of components may be separate and distinct from the communication manager 904.

In some aspects, the communication manager 904 and/or one or more components of the set of components may include or may be implemented within hardware (e.g., circuitry described in connection with FIG. 11). In some aspects, the communication manager 904 and/or one or more components of the set of components may include or may be implemented within a controller/processor, a memory, or a combination thereof, of the UE described above in connection with FIG. 2.

In some aspects, the communication manager 904 and/or one or more components of the set of components may be implemented in code (e.g., as software or firmware stored in a memory), such as the code described in connection with FIG. 11. For example, the communication manager 904 and/or a component (or a portion of a component) may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, or a combination thereof, of the UE described above in connection with FIG. 2.

In some aspects, the determination component 910 may provide means for determining at least one resource for use in transmitting or receiving a sidelink coordination information request message from a set of resources for sidelink coordination information requests. In some aspects, the transmission component 906 may provide means for transmitting the sidelink coordination information request message in the at least one resource, means for transmitting a sidelink coordination information report message, and/or means for transmitting an indication that the at least one resource is reserved for the UE. In some aspects, the reception component 902 may provide means for receiving a configuration of a set of resources for sidelink coordination information requests, receiving an indication of a resource assignment that includes the at least one resource, and/or receiving a sidelink coordination information report message. In some aspects, the communication manager 904 may provide means for performing one or more of the functions described above.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
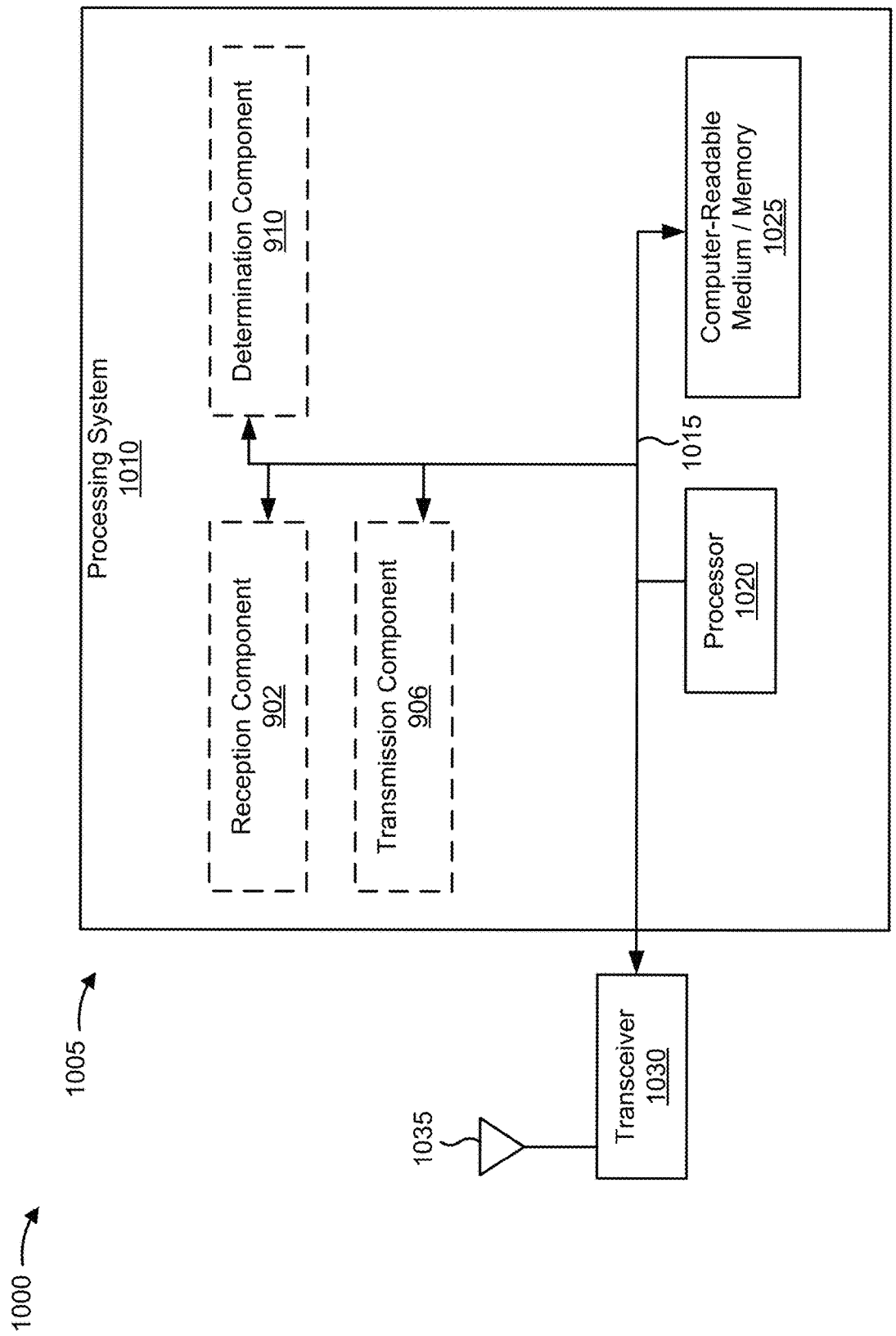
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010, in accordance with the present disclosure. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 906, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer-readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the receive processor 258, and/or the controller/processor 280. In some aspects, the apparatus 1005 for wireless communication includes means for determining at least one resource for use in transmitting a sidelink coordination information request message from a set of resources for sidelink coordination information requests, means for transmitting the sidelink coordination information request message in the at least one resource, means for transmitting an indication that the at least one resource is reserved for the UE, means for receiving an indication of a resource assignment that includes the at least one resource, and/or the like. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 10 is provided as an example. Other examples may differ from what is described in connection with FIG. 10.

Figure 11:
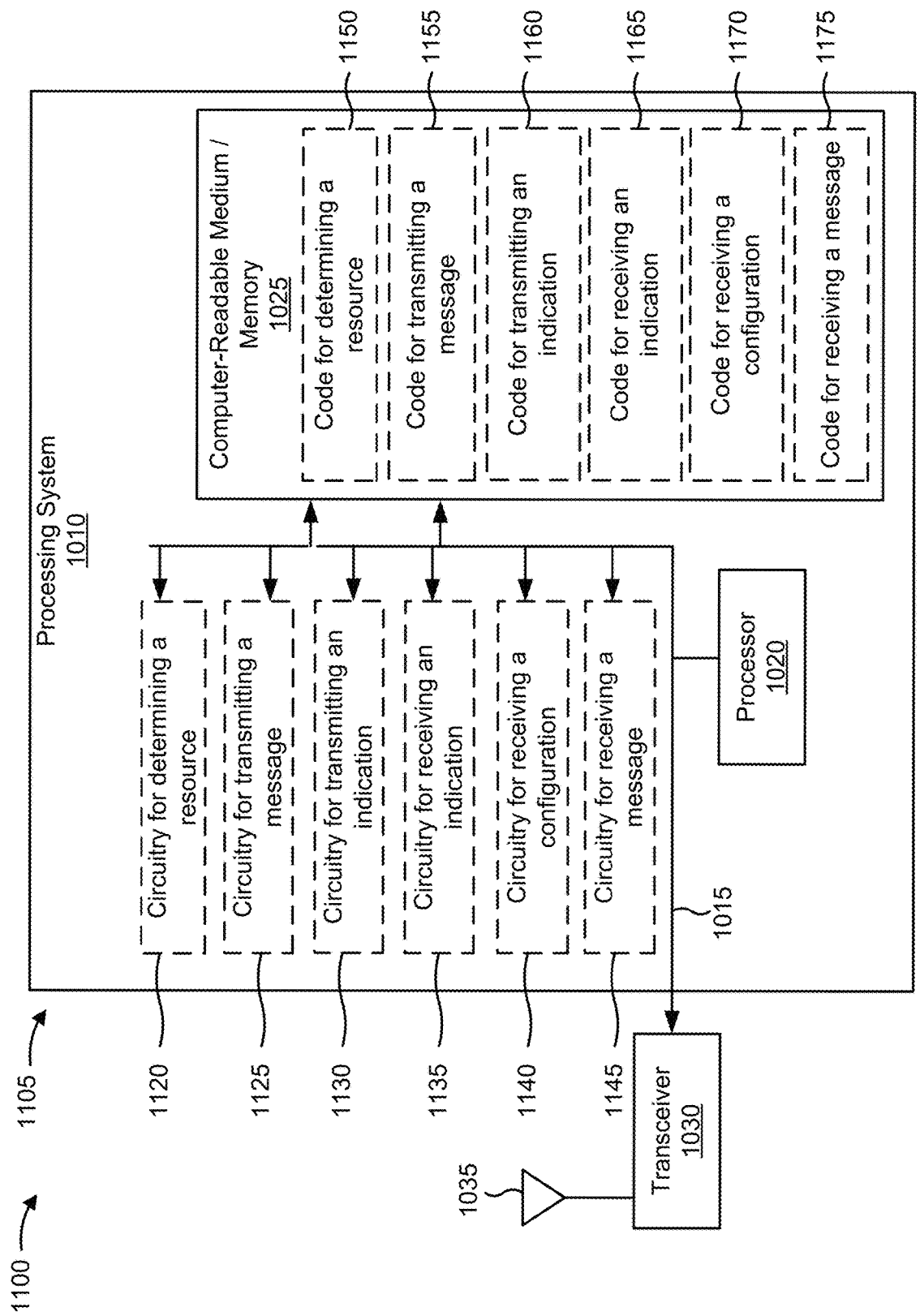
FIG. 11 is a diagram illustrating an example of an implementation of code and circuitry for an apparatus, in accordance with the present disclosure.

FIG. 11 is a diagram illustrating an example 1100 of an implementation of code and circuitry for an apparatus 1105, in accordance with the present disclosure. The apparatus 1105 may be a UE.

As shown in FIG. 11, the apparatus 1105 may include circuitry for determining a resource (circuitry 1120). For example, the circuitry 1120 may provide means for determining at least one resource for use in transmitting or receiving a sidelink coordination information request message from a set of resources for sidelink coordination information requests.

As shown in FIG. 11, the apparatus 1105 may include circuitry for transmitting a message (circuitry 1125). For example, the circuitry 1125 may provide means for transmitting the sidelink coordination information request message in the at least one resource. As another example, the circuitry 1125 may provide means for transmitting a sidelink coordination information report message.

As shown in FIG. 11, the apparatus 1105 may include circuitry for transmitting an indication (circuitry 1130). For example, the circuitry 1130 may provide means for transmitting an indication that the at least one resource is reserved for the UE.

As shown in FIG. 11, the apparatus 1105 may include circuitry for receiving an indication (circuitry 1135). For example, the circuitry 1135 may provide means for receiving an indication of a resource assignment that includes the at least one resource. As another example, the circuitry 1135 may provide means for receiving an indication that the at least one resource is reserved.

As shown in FIG. 11, the apparatus 1105 may include circuitry for receiving a configuration (circuitry 1140). For example, the circuitry 1140 may provide means for receiving a configuration of a set of resources for sidelink coordination information requests.

As shown in FIG. 11, the apparatus 1105 may include circuitry for receiving a message (circuitry 1145). For example, the circuitry 1145 may provide means for receiving the sidelink coordination information request message. As another example, the circuitry 1145 may provide means for receiving the sidelink coordination information report message.

The circuitry 1120, 1125, 1130, 1135, 1140, and/or 1145 may include one or more components of the UE described above in connection with FIG. 2, such as transmit processor 264, TX MIMO processor 266, MOD 254, DEMOD 254, MIMO detector 256, receive processor 258, antenna 252, controller/processor 280, and/or memory 282.

As shown in FIG. 11, the apparatus 1105 may include, stored in computer-readable medium 1025, code for determining a resource (code 1150). For example, the code 1150, when executed by the processor 1020, may cause the apparatus 1105 to determine at least one resource for use in transmitting or receiving a sidelink coordination information request message from a set of resources for sidelink coordination information requests.

As shown in FIG. 11, the apparatus 1105 may include, stored in computer-readable medium 1025, code for transmitting a message (code 1155). For example, the code 1155, when executed by the processor 1020, may cause the apparatus 1105 to transmit the sidelink coordination information request message in the at least one resource. As another example, the code 1155, when executed by the processor 1020, may cause the apparatus 1105 to transmit a sidelink coordination information report message.

As shown in FIG. 11, the apparatus 1105 may include, stored in computer-readable medium 1025, code for transmitting an indication (code 1160). For example, the code 1160, when executed by the processor 1020, may cause the apparatus 1105 to transmit an indication that the at least one resource is reserved for the UE. As another example, the code 1160, when executed by the processor 1020, may cause the apparatus 1105 to receive an indication that the at least one resource is reserved.

As shown in FIG. 11, the apparatus 1105 may include, stored in computer-readable medium 1025, code for receiving an indication (code 1165). For example, the code 1165, when executed by the processor 1020, may cause the apparatus 1105 to receive an indication of a resource assignment that includes the at least one resource.

As shown in FIG. 11, the apparatus 1105 may include, stored in computer-readable medium 1025, code for receiving a configuration (code 1170). For example, the code 1170, when executed by the processor 1020, may cause the apparatus 1105 to receive a configuration of a set of resources for sidelink coordination information requests.

As shown in FIG. 11, the apparatus 1105 may include, stored in computer-readable medium 1025, code for receiving a message (code 1175). For example, the code 1175, when executed by the processor 1020, may cause the apparatus 1105 to receive the sidelink coordination information request message. As another example, the code 1175, when executed by the processor 1020, may cause the apparatus 1105 to receive the sidelink coordination information report message.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: determining at least one resource for use in transmitting a sidelink coordination information request message from a set of resources for sidelink coordination information requests; and transmitting the sidelink coordination information request message in the at least one resource.

Aspect 2: The method of Aspect 1, wherein the at least one resource is determined using a procedure for sensing channel availability.

Aspect 3: The method of any of Aspects 1-2, further comprising: transmitting an indication that the at least one resource is reserved for the UE.

Aspect 4: The method of Aspect 1, wherein the at least one resource is randomly determined.

Aspect 5: The method of Aspect 1, wherein the at least one resource is determined based at least in part on an identifier of the UE.

Aspect 6: The method of any of Aspects 1 or 5, wherein the at least one resource is determined based at least in part on an identifier of another UE that is to respond to the sidelink coordination information request message.

Aspect 7: The method of any of Aspects 1 or 5-6, wherein the at least one resource is determined based at least in part on a periodicity of requesting occasions for sidelink coordination information requests.

Aspect 8: The method of any of Aspects 1-7, wherein the set of resources for sidelink coordination information requests are in a single requesting occasion that maps to a single reporting occasion.

Aspect 9: The method of Aspect 8, wherein the set of resources for sidelink coordination information requests are consecutively indexed within the single requesting occasion.

Aspect 10: The method of any of Aspects 1-7, wherein the set of resources for sidelink coordination information requests are in multiple requesting occasions that map to a single reporting occasion.

Aspect 11: The method of Aspect 10, wherein the set of resources for sidelink coordination information requests are consecutively indexed across the multiple requesting occasions.

Aspect 12: The method of Aspect 10, wherein the set of resources for sidelink coordination information requests are consecutively indexed within a single requesting occasion of the multiple requesting occasions.

Aspect 13: The method of Aspect 10, wherein a first resource in a first requesting occasion of the multiple requesting occasions and a second resource in a second requesting occasion of the multiple requesting occasions are associated with a same index value and different resources of the single reporting occasion.

Aspect 14: The method of any of Aspects 1-13, wherein different resources of the set of resources for sidelink coordination information requests are assigned to the UE and another UE that is in a group with the UE.

Aspect 15: The method of any of Aspects 1-14, further comprising: receiving an indication of a resource assignment that includes the at least one resource.

Aspect 16: The method of any of Aspects 1-15, wherein an indexing of the set of resources for sidelink coordination information requests changes over time.

Aspect 17: The method of any of Aspects 1-16, wherein an indexing of the set of resources for sidelink coordination information requests in a requesting occasion is different for the UE and another UE.

Aspect 18: The method of any of Aspects 1-17, wherein the at least one resource is determined as a function of time and based at least in part on an identifier of the UE or an identifier of another UE that is to respond to the sidelink coordination information request message.

Aspect 19: The method of any of Aspects 1-18 further comprising: receiving a configuration of the set of resources for sidelink coordination information requests.

Aspect 20: The method of any of Aspects 1-19 further comprising: receiving a sidelink coordination information report message in response to the sidelink coordination information request message.

Aspect 21: A method of wireless communication performed by a user equipment (UE), comprising: determining at least one resource for use in receiving a sidelink coordination information request message from a set of resources for sidelink coordination information requests; and receiving the sidelink coordination information request message in the at least one resource.

Aspect 22: The method of Aspect 21, further comprising: receiving an indication that the at least one resource is reserved.

Aspect 23: The method of Aspect 21, further comprising: decoding transmissions in each resource of the set of resources.

Aspect 24: The method of Aspect 21, wherein the at least one resource is determined based at least in part on an identifier of another UE that is to transmit the sidelink coordination information request message.

Aspect 25: The method of any of Aspects 21 or 24, wherein the at least one resource is determined based at least in part on an identifier of the UE.

Aspect 26: The method of any of Aspects 21 or 24-25, wherein the at least one resource is determined based at least in part on a periodicity of requesting occasions for sidelink coordination information requests.

Aspect 27: The method of any of Aspects 21-26, wherein the set of resources for sidelink coordination information requests are in a single requesting occasion that maps to a single reporting occasion.

Aspect 28: The method of Aspect 27, wherein the set of resources for sidelink coordination information requests are consecutively indexed within the single requesting occasion.

Aspect 29: The method of any of Aspects 21-26, wherein the set of resources for sidelink coordination information requests are in multiple requesting occasions that map to a single reporting occasion.

Aspect 30: The method of Aspect 29, wherein the set of resources for sidelink coordination information requests are consecutively indexed across the multiple requesting occasions.

Aspect 31: The method of Aspect 29, wherein the set of resources for sidelink coordination information requests are consecutively indexed within a single requesting occasion of the multiple requesting occasions.

Aspect 32: The method of Aspect 29, wherein a first resource in a first requesting occasion of the multiple requesting occasions and a second resource in a second requesting occasion of the multiple requesting occasions are associated with a same index value and different resources of the single reporting occasion.

Aspect 33: The method of any of Aspects 21-32, wherein different resources of the set of resources for sidelink coordination information requests are assigned to another UE that is to transmit the sidelink coordination request message and an additional UE that is in a group with the other UE.

Aspect 34: The method of any of Aspects 21-33, wherein an indexing of the set of resources for sidelink coordination information requests changes over time.

Aspect 35: The method of any of Aspects 21-34, wherein an indexing of the set of resources for sidelink coordination information requests in a requesting occasion is different for the UE and another UE.

Aspect 36: The method of any of Aspects 21-35, wherein the at least one resource is determined as a function of time and based at least in part on an identifier of the UE or an identifier of another UE that is to transmit the sidelink coordination information request message.

Aspect 37: The method of any of Aspects 21-36 further comprising: receiving a configuration of the set of resources for sidelink coordination information requests.

Aspect 38: The method of any of Aspects 21-37 further comprising: transmitting a sidelink coordination information report message in response to the sidelink coordination information request message.

Aspect 39: An apparatus for wireless communication at a device, comprising a processor; memory coupled with the processor; and instructions stored in the memory and executable by the processor to cause the apparatus to perform the method of one or more of Aspects 1-20.

Aspect 40: A device for wireless communication, comprising a memory and one or more processors coupled to the memory, the one or more processors configured to perform the method of one or more of Aspects 1-20.

Aspect 41: An apparatus for wireless communication, comprising at least one means for performing the method of one or more of Aspects 1-20.

Aspect 42: A non-transitory computer-readable medium storing code for wireless communication, the code comprising instructions executable by a processor to perform the method of one or more of Aspects 1-20.

Aspect 43: A non-transitory computer-readable medium storing a set of instructions for wireless communication, the set of instructions comprising one or more instructions that, when executed by one or more processors of a device, cause the device to perform the method of one or more of Aspects 1-20.

Aspect 44: An apparatus for wireless communication at a device, comprising a processor; memory coupled with the processor; and instructions stored in the memory and executable by the processor to cause the apparatus to perform the method of one or more of Aspects 21-38.

Aspect 45: A device for wireless communication, comprising a memory and one or more processors coupled to the memory, the one or more processors configured to perform the method of one or more of Aspects 21-38.

Aspect 46: An apparatus for wireless communication, comprising at least one means for performing the method of one or more of Aspects 21-38.

Aspect 47: A non-transitory computer-readable medium storing code for wireless communication, the code comprising instructions executable by a processor to perform the method of one or more of Aspects 21-38.

Aspect 48: A non-transitory computer-readable medium storing a set of instructions for wireless communication, the set of instructions comprising one or more instructions that, when executed by one or more processors of a device, cause the device to perform the method of one or more of Aspects 21-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more processors;
   one or more memories, coupled to the one or more processors and storing one or more instructions that, when executed by the one or more processors, cause the UE to:
      receive a configuration of a set of resources for sidelink coordination information requests; and
      transmit a sidelink coordination information request message in at least one resource selected from the set of resources for sidelink coordination information requests, wherein the at least one resource is based at least in part on one or more of an identifier of the UE, an identifier of another UE that is to respond to the sidelink coordination information request message, or a periodicity of requesting occasions for sidelink coordination information requests.

2. The UE of claim 1, wherein the at least one resource is randomly selected.

3. The UE of claim 1, wherein the set of resources for sidelink coordination information requests are in a requesting occasion that occurs periodically.

4. The UE of claim 1, wherein the set of resources for sidelink coordination information requests are in a single requesting occasion.

5. The UE of claim 4, wherein the single requesting occasion maps to a single reporting occasion.

6. The UE of claim 4, wherein the set of resources for sidelink coordination information requests are consecutively indexed within the single requesting occasion.

7. The UE of claim 1, wherein the set of resources for sidelink coordination information requests are in a group of multiple requesting occasions that occur periodically.

8. The UE of claim 1, wherein the set of resources for sidelink coordination information requests are in multiple requesting occasions.

9. The UE of claim 8, wherein the multiple requesting occasions map to a single reporting occasion.

10. The UE of claim 8, wherein the set of resources for sidelink coordination information requests are consecutively indexed across the multiple requesting occasions.

11. The UE of claim 8, wherein the set of resources for sidelink coordination information requests are consecutively indexed within a single requesting occasion of the multiple requesting occasions.

12. The UE of claim 8, wherein a first resource in a first requesting occasion of the multiple requesting occasions and a second resource in a second requesting occasion of the multiple requesting occasions are associated with a same index value and different resources of a reporting occasion.

13. The UE of claim 1, wherein the one or more processors are further configured to:

receive an indication of a resource assignment for the at least one resource.

14. The UE of claim 1, wherein an indexing of the set of resources for sidelink coordination information requests changes over time.

15. A user equipment (UE) for wireless communication, comprising:
one or more processors;
one or more memories, coupled to the one or more processors and storing one or more instructions that, when executed by the one or more processors, cause the UE to:
transmit a sidelink coordination information request message in at least one resource selected from a set of resources for sidelink coordination information requests, wherein the at least one resource is based at least in part on one or more of an identifier of the UE, an identifier of another UE that is to respond to the sidelink coordination information request message, or a periodicity of requesting occasions for sidelink coordination information requests; and
receive a sidelink coordination information report message in response to the sidelink coordination information request message.

16. The UE of claim 15, wherein the at least one resource is selected using a procedure for sensing channel availability.

17. The UE of claim 15, wherein the one or more processors are further configured to:
transmit an indication that the at least one resource is reserved for the UE.

18. The UE of claim 15, wherein the at least one resource is randomly selected.

19. The UE of claim 15, wherein the set of resources for sidelink coordination information requests are in a single requesting occasion.

20. The UE of claim 19, wherein the set of resources for sidelink coordination information requests are consecutively indexed within the single requesting occasion.

21. The UE of claim 15, wherein the set of resources for sidelink coordination information requests are in multiple requesting occasions.

22. The UE of claim 21, wherein the set of resources for sidelink coordination information requests are consecutively indexed across the multiple requesting occasions.

23. The UE of claim 21, wherein the set of resources for sidelink coordination information requests are consecutively indexed within a single requesting occasion of the multiple requesting occasions.

24. The UE of claim 15, wherein the one or more processors are further configured to:

receive an indication of a resource assignment that includes the at least one resource.

25. A user equipment (UE) for wireless communication, comprising:
one or more processors;
one or more memories, coupled to the one or more processors and storing one or more instructions that, when executed by the one or more processors, cause the UE to:
receive a configuration of a set of resources for sidelink coordination information requests; and
receive a sidelink coordination information request message in at least one resource from the set of resources for sidelink coordination information requests, wherein the at least one resource is based at least in part on one or more of an identifier of the UE, an identifier of another UE that is to respond to the sidelink coordination information request message, or a periodicity of requesting occasions for sidelink coordination information requests.

26. A user equipment (UE) for wireless communication, comprising:
one or more processors;
one or more memories, coupled to the one or more processors and storing one or more instructions that, when executed by the one or more processors, cause the UE to:
receive a sidelink coordination information request message in at least one resource from a set of resources for sidelink coordination information requests, wherein the at least one resource is based at least in part on one or more of an identifier of the UE, an identifier of another UE that is to respond to the sidelink coordination information request message, or a periodicity of requesting occasions for sidelink coordination information requests; and
transmit a sidelink coordination information report message in response to the sidelink coordination information request message.

27. The UE of claim 25, wherein the at least one resource is randomly selected.

28. The UE of claim 25, wherein the set of resources for sidelink coordination information requests are in a single requesting occasion or a requesting occasion that occurs periodically.

29. The UE of claim 26, wherein the at least one resource is randomly selected.

30. The UE of claim 26, wherein the set of resources for sidelink coordination information requests are in a single requesting occasion or a requesting occasion that occurs periodically.

* * * * *